US012676432B2

(12) United States Patent
Kamor et al.

(10) Patent No.: US 12,676,432 B2
(45) Date of Patent: Jul. 7, 2026

(54) WIRE TERMINALS AND METHOD OF USES

(71) Applicant: Leviton Manufacturing Co., Inc., Melville, NY (US)

(72) Inventors: Michael Kamor, North Massapequa, NY (US); Ronald Jansen, Ridgewood, NY (US); Kelly Tyler, Levittown, NY (US); Nicholas Pilato, Forest Hills, NY (US); Stephen Aaron, East Patchogue, NY (US)

(73) Assignee: Leviton Manufacturing Co., Inc., Melville, NY (US)

(*) Notice: Subject to any disclaimer, the term of this patent is extended or adjusted under 35 U.S.C. 154(b) by 307 days.

(21) Appl. No.: 18/036,509

(22) PCT Filed: Jan. 24, 2023

(86) PCT No.: PCT/US2023/011397
§ 371 (c)(1),
(2) Date: May 11, 2023

(87) PCT Pub. No.: WO2023/154177
PCT Pub. Date: Aug. 17, 2023

(65) Prior Publication Data

US 2024/0380137 A1 Nov. 14, 2024

Related U.S. Application Data

(60) Provisional application No. 63/308,125, filed on Feb. 9, 2022.

(51) Int. Cl.
*H01R 13/62* (2006.01)
*H01R 4/48* (2006.01)
(Continued)

(52) U.S. Cl.
CPC ........... *H01R 9/2491* (2013.01); *H01R 4/483* (2023.08); *H01R 24/78* (2013.01); *H01R 2103/00* (2013.01)

(58) Field of Classification Search
CPC ...... H01R 9/2491; H01R 4/483; H01R 24/78; H01R 2103/00
See application file for complete search history.

(56) References Cited

U.S. PATENT DOCUMENTS 4,759,726 A 7/1988 Naylor
6,250,950 B1 6/2001 Pallai
(Continued)

FOREIGN PATENT DOCUMENTS

CN 111697357 A 9/2020
DE 102019116930 A1 12/2020
(Continued)

OTHER PUBLICATIONS

International Search Report and Written Opinion for International Application No. PCT/US2025/025714, filing date Apr. 22, 2025, 12 pages.
(Continued)

*Primary Examiner* — Abdullah A Riyami
*Assistant Examiner* — Nelson R. Burgos-Guntin
(74) *Attorney, Agent, or Firm* — KDW Firm PLLC

(57) ABSTRACT

The present disclosure relates to wire terminals and/or termination mechanisms arranged and configured for use with a wiring device. The wire terminals may be used in any suitable line-voltage wiring device. The wire terminals are arranged and configured to selectively receive a distal end of a wire therein.

23 Claims, 23 Drawing Sheets

(51) Int. Cl.

| | |
|---|---|
| ***H01R 9/24*** | (2006.01) |
| ***H01R 24/78*** | (2011.01) |
| *H01R 103/00* | (2006.01) |

(56) References Cited

U.S. PATENT DOCUMENTS

| | | | | |
|---|---|---|---|---|
| 6,749,449 | B2 | 6/2004 | Mortun | |
| 7,114,986 | B1 | 10/2006 | Toly | |
| 7,909,664 | B2 | 3/2011 | Ilkhanov | |
| 7,963,812 | B2 | 6/2011 | Ilkhanov | |
| 8,047,883 | B2 | 11/2011 | Montalbano | |
| 8,137,145 | B2 | 3/2012 | Joy | |
| 8,475,191 | B2 | 7/2013 | Schafmeister | |
| 9,124,034 | B2 | 9/2015 | Kollmann | |
| 9,413,082 | B2 | 8/2016 | Gassauer | |
| 9,466,895 | B2 | 10/2016 | Kollmann | |
| 9,502,790 | B2 | 11/2016 | Kollmann | |
| 10,230,179 | B2 | 3/2019 | Wilinski | |
| 10,418,727 | B1 | 9/2019 | Wu | |
| 10,461,444 | B2 | 10/2019 | Scanzillo et al. | |
| 11,495,895 | B2 | 11/2022 | Scanzillo et al. | |
| 11,705,667 | B2 | 7/2023 | Moser | |
| 2002/0067582 | A1* | 6/2002 | Germain | H01H 73/14 361/42 |
| 2002/0135958 | A1* | 9/2002 | Germain | H01H 83/04 361/42 |
| 2005/0030685 | A1* | 2/2005 | DiSalvo | H01H 83/02 361/42 |
| 2006/0279886 | A1* | 12/2006 | Huang | H01R 13/7135 361/42 |
| 2007/0041134 | A1* | 2/2007 | Huang | H01H 71/123 361/42 |
| 2007/0066143 | A1 | 3/2007 | Lin et al. | |
| 2010/0003865 | A1 | 1/2010 | Alderson | |
| 2010/0304596 | A1* | 12/2010 | Ilkhanov | H01R 4/5008 439/157 |
| 2011/0130015 | A1* | 6/2011 | Lacey | H02G 3/18 439/490 |
| 2011/0279933 | A1* | 11/2011 | Campolo | H02H 11/002 361/42 |
| 2013/0005175 | A1 | 1/2013 | Rineau et al. | |
| 2013/0157520 | A1 | 6/2013 | Koellmann | |
| 2015/0372402 | A1 | 12/2015 | Kollmann | |
| 2016/0020543 | A1 | 1/2016 | Tedeschi | |
| 2016/0190713 | A1 | 6/2016 | Wu et al. | |
| 2018/0331438 | A1 | 11/2018 | Moser | |
| 2020/0350706 | A1* | 11/2020 | Scanzillo | H01R 4/5008 |
| 2021/0083409 | A1 | 3/2021 | Hartmann | |
| 2022/0294130 | A1 | 9/2022 | Ding | |
| 2023/0024505 | A1 | 1/2023 | Scanzillo | |
| 2023/0036314 | A1 | 2/2023 | Scanzillo | |
| 2023/0327377 | A1 | 10/2023 | Scanzillo | |

FOREIGN PATENT DOCUMENTS

| | | | |
|---|---|---|---|
| DE | 102020104140 | A1 | 8/2021 |
| DE | 102020118578 | A1 | 1/2022 |
| EP | 2096714 | A1 | 9/2009 |
| EP | 2355249 | A1 | 8/2011 |
| EP | 1956684 | B1 | 7/2013 |
| WO | 2014191676 | A1 | 12/2014 |

OTHER PUBLICATIONS

International Search Report and Written Opinion for International Application No. PCT/US24/23075, dated Aug. 30, 2024, 12 pages.

Logic Plus™ Rapid Fix, MK by Honeywell® Brochure, Aug. 4, 2021—4 pages.

International Search Report and Written Opinion for the International Patent Application No. PCT/US2023/011397, mailed May 4, 2023, 18 pages.

International Search Report and Written Opinion for the International Patent Application No. PCT/US2023/011392, mailed May 4, 2023, 16 pages.

* cited by examiner

WIRE TERMINALS AND METHOD OF USES

CROSS-REFERENCE TO RELATED APPLICATIONS

This application is a national stage application claiming the benefit of and priority to International Application No. PCT/US2023/011397 entitled "WIRE TERMINALS AND METHOD OF USES" filed Jan. 24, 2023, which is a non-provisional of, and claims the benefit of the filing date of, U.S. Provisional Patent Application No. 63/308,125, filed Feb. 9, 2022, entitled "WIRE TERMINALS AND METHOD OF USES," the entirety of each application is incorporated by reference herein.

TECHNICAL FIELD

The present disclosure is directed to wiring devices and, more particularly, to wiring devices including improved wire terminals or termination mechanisms (terms used interchangeably herein without the intent to limit) and related methods of use thereof.

BACKGROUND

To route, install and otherwise use AC electrical power, manufacturers produce many different kinds of devices. These devices are referred to herein as wiring devices. Examples of wiring devices include electrical receptacles, switches, dimmers, sensors, ground/arc fault circuit interrupters, and fan speed controls. Wiring devices are connected to the AC electrical power via wires/conductors (the terms wire and conductor may be used hereinafter synonymously), which can include solid core conductors and/or stranded wire conductors. A wire includes (or is considered to be) a conductive path for carrying the AC electrical power.

Wiring devices typically include wire termination terminals for terminating wires. Terminal types typically found on wiring devices include sets of line and load terminals and/or ground terminals. Each set of line and/or load terminals typically comprise individual phase and neutral terminals. Together these terminals, depending on the mechanical configuration, may be wired using one or more of several different common termination mechanisms/techniques where the mechanical configuration of the termination mechanisms typically dictates the technique used.

One such termination mechanism/technique is commonly referred to as "side-wire" (or otherwise referred to as "wrap-wire"). To terminate a wire using a side-wire terminal, an end of the wire is initially stripped to expose at least a portion of the end of the wire and then this exposed portion is wrapped around a terminal screw. The terminal screw is then tightened causing the head of the screw to secure the exposed wire between the head of the screw and a metallic plate (e.g., a brass terminal).

Another type of wiring mechanism/technique is referred to as "back-wire" (otherwise also referred to as "clamp-wire"). Typically, in back-wire terminals a screw engages a metallic plate with a second metallic plate (the resulting arrangement forming in a clamp) to compress a wire therebetween. In such a back-wire termination mechanism, a first metallic plate typically has a threaded opening and forms the clamp arrangement with a second metallic plate that has a non-threaded opening sized large enough to allow this second metallic plate to slide along the shaft of the screw between the first metallic plate and the head of the screw. Placing an exposed end of a stripped wire between the two metallic plates and tightening the screw results in the wire being removably secured between the two plates.

Another type of wire terminal mechanism/technique is referred to as "push in". Push-in termination mechanisms typically comprise a small hole, or aperture, in the wiring device housing through which an exposed end of a stripped wire is inserted and removably secured within the wiring device with the cooperation of a retention mechanism. For example, an end of a solid wire is initially stripped to expose about five-eighths of an inch of the wire. The resultant exposed portion of the wire is then inserted through the hole and into engagement with the internal retention mechanism which removably secures the exposed end of the wire by, e.g., applying clamping pressure to the wire in order to maintain the wire in electrical contact with an internal conductive portion of the wiring device. The retention mechanism provides sufficient resistance to prevent the wire from being pulled out of the hole. Typically, to release the wire, a tool (e.g., a screwdriver) is used to engage a releasing mechanism to release the wire.

Wiring devices usually also include a ground terminal that typically uses a wrap-wire/side-wire arrangement, as described above; e.g., a metallic plate that includes a threaded opening for receiving a ground terminal screw. Grounded wiring devices could also employ a conductive strap, or frame, that may be used in conjunction with a ground terminal screw for grounding the device. Wiring devices that use such a ground terminal screw in a side-wire/wrap-wire configuration would be wired as discussed above using an exposed portion of the ground wire.

It is desirable for wiring devices to incorporate wire termination mechanisms that are easier to use and that facilitate quicker installation as well as providing reliable and secure wire retention. Accordingly, there remains a need for improved wire termination mechanisms. It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein is a wiring device. In one embodiment, the wiring device includes a housing, an electrical contact disposed at least partially within the housing, the electrical contact arranged and configured to accept plug blades, the electrical contact further including a cage defining an opening, and a wire terminal arranged and configured to mechanically and electrically secure a line-voltage AC electrical wire to the electrical contact. In one embodiment, the wire terminal includes a lever, a first spring, and a biasing element. The lever is arranged and configured to move between a first position and a second position. The first spring is positioned at least partially within the opening formed in the cage, the first spring and the opening defining an electrical wire receiving space. The biasing element is arranged and configured to apply a force onto the lever to maintain the lever in the first position. In the second position, the lever moves the first spring to enlarge the electrical wire receiving space to receive the electrical wire. In the first position, the first spring biases the electrical wire against the electrical contact to securely retain the electrical wire within the electrical wire receiving space and in contact with the electrical contact.

In one embodiment, the biasing element is a biasing spring.

In one embodiment, the biasing spring is disposed between the housing and the lever to bias the lever to the first position.

In one embodiment, the biasing spring is selected from one of a compression spring, a leaf spring, and a torsion spring.

In one embodiment, the biasing spring is a compression spring including a first end and a second end, the first end of the compression spring being in contact with the housing, the second end of the compression spring contacting the lever to exert a force to bias the lever to the first position.

In one embodiment, the biasing spring is a leaf spring including a first leg and a second leg, the first leg of the leaf spring being in contact with the housing, the second leg of the leaf spring contacting the lever to exert a force to bias the lever to the first position.

In one embodiment, the biasing spring is a torsion spring including a first segment and a second segment, the first segment of the torsion spring being in contact with the housing, the second segment of the torsion spring contacting the lever to exert a force to bias the lever to the first position.

In one embodiment, the wiring device further includes a secondary retention element arranged and configured to contact a portion of the electrical wire once the electrical wire has been inserted into the housing.

In one embodiment, the lever is pivotable between the first and second positions.

In one embodiment, the first spring includes a sharp edge arranged and configured to contact the electrical wire to provide additional retention force in maintaining the electrical wire in the electrical wire receiving space.

In one embodiment, in the second position, the lever moves the first spring away from the electrical contact to enlarge the electrical wire receiving space so that the electrical wire can be freely inserted without interference or resistance.

In one embodiment, the first spring includes a first leg, a second leg, and a bend, wherein the bend couples the first and second legs, and wherein movement of the lever from the first position to the second position causes the first and second legs to move relative to each other to enlarge the electrical wire receiving space.

In one embodiment, the lever includes a bearing surface, movement of the lever from the first position to the second position causes the bearing surface formed on the lever to contact the second leg of the first spring, which moves the second leg of the first spring.

In one embodiment, the lever includes a bearing surface, movement of the lever from the first position to the second position causes the bearing surface formed on the lever to contact the second leg of the first spring, which compresses the second leg towards the first leg.

In one embodiment, the housing includes an aperture formed in a rear surface thereof, the aperture being arranged and configured to receive the electrical wire therein, the aperture formed in the rear surface of the housing being aligned with the opening formed in the cage.

In one embodiment, the wiring device further includes a retention element for gripping a portion of the electrical wire once the electrical wire has been inserted through the aperture formed in the rear surface of the housing.

In one embodiment, the retention element includes a torsion spring, the torsion spring including an arm, wherein movement of the lever to the second position moves the arm to a second position to allow the electrical wire to be inserted through the aperture formed in the housing, wherein subsequent movement of the lever from the second position to the first position causes the arm to contact the electrical wire and retain the electrical wire at least partially within the housing.

In one embodiment, the arm is a second arm, the torsion spring further comprising a first arm, the first arm being part of the biasing element to contact the lever to exert a force onto the lever to bias the lever to the first position.

In one embodiment, the wiring device is a line-voltage wiring device arranged and configured to be inserted into a wall box.

In one embodiment, the line-voltage wiring device is selected from one of an electrical receptacle, ground fault circuit interrupters, and arc fault circuit interrupters.

An alternate embodiment of a wiring device is disclosed. The wiring device including a housing, an electrical contact disposed at least partially within the housing, the electrical contact including a cage defining an opening, and a wire terminal arranged and configured to mechanically and electrically secure a line-voltage AC electrical wire to the electrical contact. The wire terminal includes a lever arranged and configured to move between a first position and a second position, a first spring positioned at least partially within the opening formed in the cage, the first spring and the opening defining an electrical wire receiving space, and a biasing element arranged and configured to apply a force onto the lever to maintain the lever in the first position. In the second position, the lever moves the first spring to enlarge the electrical wire receiving space to receive the electrical wire. In the first position, the first spring biases the electrical wire against the electrical contact to securely retain the electrical wire within the electrical wire receiving space and in contact with the electrical contact.

An alternate embodiment of a wiring device is disclosed. The wiring device including a housing, an electrical contact disposed at least partially within the housing, the electrical contact including a cage defining an opening, and a wire terminal arranged and configured to mechanically and electrically secure a line-voltage AC electrical wire to the electrical contact. The wire terminal including a lever arranged and configured to move between a first position and a second position, a first spring positioned at least partially within the opening formed in the cage, the first spring and the opening defining an electrical wire receiving space, a biasing spring arranged and configured to apply a force onto the lever to maintain the lever in the first position, and a retention element arranged and configured to grip a portion of the electrical wire once the electrical wire has been inserted through an aperture formed in a rear surface of the housing. In the second position, the lever moves the first spring to enlarge the electrical wire receiving space to receive the electrical wire. In the first position, the first spring biases the electrical wire against the electrical contact to securely retain the electrical wire within the electrical wire receiving space and in contact with the electrical contact.

BRIEF DESCRIPTION OF THE DRAWINGS

By way of example, a specific embodiment of the disclosed device will now be described, with reference to the accompanying drawings, in which:

FIG. 1A illustrates the wiring device along with a standard wall plate, FIG. 1B illustrates the wiring device without the wallplate;

Figure 1A:
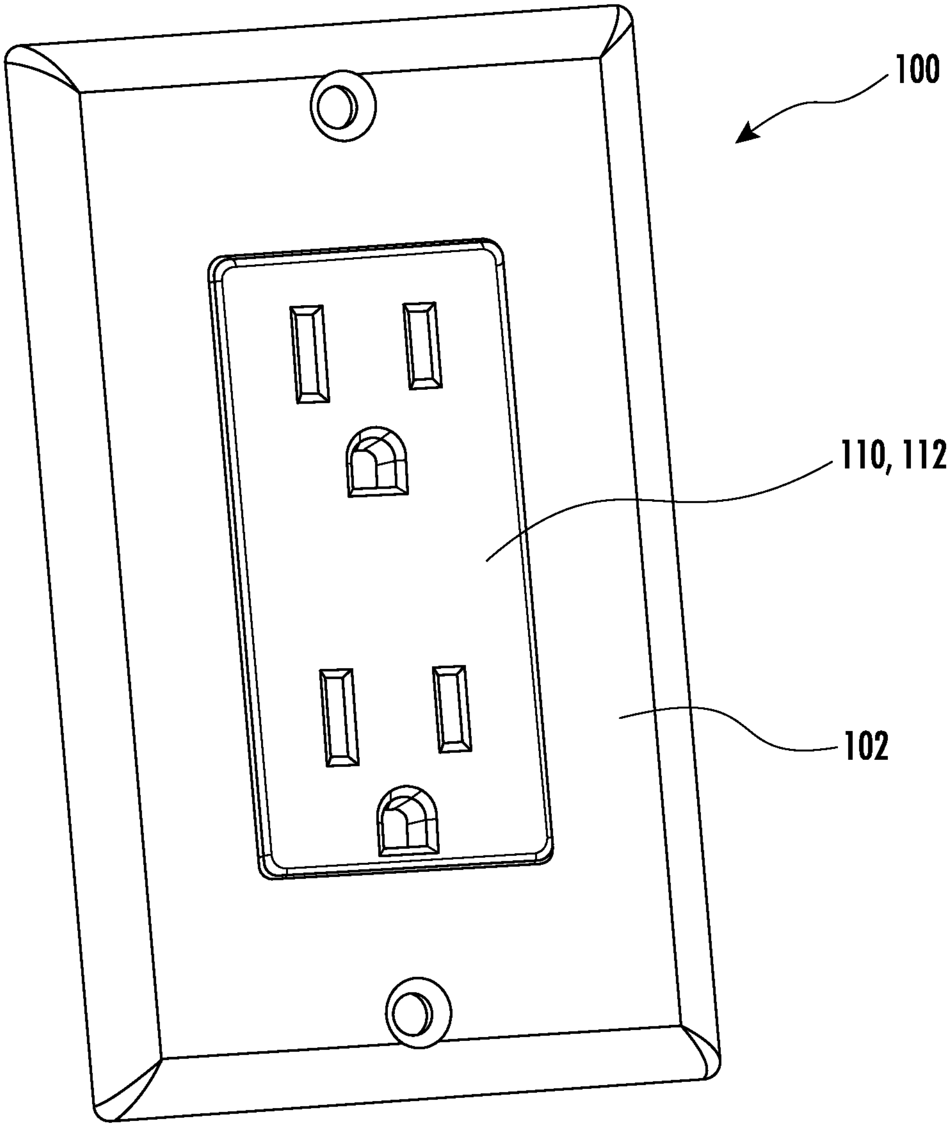
FIGS. 1A and 1B illustrate perspective views of an embodiment of a wiring device.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of a wire terminal or a wire termination mechanism (terms used interchangeable herein) and corresponding methods of use arranged and configured to enable a wire (e.g., an electrical wire) to be installed into a wiring device will now be described more fully hereinafter with reference to the accompanying drawings, in which one or more features of the wire terminal will be shown and described. It should be appreciated that the various features may be used independently of, or in combination, with each other. It will be appreciated that the various wire terminals as disclosed herein may be embodied in many different forms and should not be construed as being limited to the embodiments set forth herein. Rather, these embodiments are provided so that this disclosure will convey certain features of the wire terminals to those skilled in the art.

In accordance with one or more features of the present disclosure, various wire terminals arranged and configured to enable an installer to quickly and easily install, engage, couple, etc. (terms used interchangeably herein without the intent to limit or distinguish) one or more electrical wires to an electrical wiring device will be shown and described. As will be described herein, the wire terminals may be arranged and configured to enable an installer to quickly and easily install one or more electrical wires to an electrical wiring device without the need for any additional tools such as, for example, without the need for a screwdriver (e.g., the wire terminals are configured to allow a user to open and close a lever without the need for an excessive amount of force (i.e., without the need for a tool such as a screwdriver) allowing for tool-less wire termination). Rather, as will be described herein, various embodiments utilizing a lever and a spring element (e.g., a clamp spring) to selectively engage the electrical wire to the wiring device (e.g., the wire terminals are arranged and configured to mechanically and electrically secure an electrical wire to an electrical terminal) will be shown and described. In addition, in accordance with one or more features of the present disclosure, the wire terminal may incorporate a biasing element such as, for example, a biasing spring, to bias the lever to a first position (e.g., a biasing element arranged and configured to take up any play or slack in the lever due to, for example, insertion of the electrical wire). Thus arranged, in use, the biasing element or spring is arranged and configured to apply a force onto the lever to maintain the lever in the first position once the lever has moved a certain amount or percentage from the second position. Moreover, in accordance with one or more features of the present disclosure that may be used in combination with, or separate from the wire terminal, the wiring device may also include a retention element or mechanism (terms used interchangeably herein) arranged and configured to restrain a portion or a free end of the electrical wire once the electrical wire has entered the wiring device (e.g., to restrain a portion of the electrical wire within the housing).

It should be appreciated that the various wire terminals and/or the retention elements may be incorporated into any suitable wiring device arranged and configured to receive line-voltage, either now known or hereafter developed such as, for example, an electrical receptacle, a switch, a dimmer, a sensor, a ground/arc fault circuit interrupter, or a fan speed control. As such, it should be understood that the term "wiring device" is intended to include any of the standard line voltage electrical devices that are now known or hereafter developed. Line voltage refers to a voltage, typically Alternating Current (AC), that is supplied to buildings/residences (e.g., electric light and power), for example, 110 VAC, 115 VAC, 120 VAC, 125 VAC, 208 VAC, 220 VAC, 230 VAC, 240 VAC, single or multiphase. Line voltage devices are distinguished from low voltage devices, which refer to devices that receive a voltage which is less than a certain threshold (50 Volts for example, AC or DC). This reduced voltage is typically used for communication, signaling, data/multimedia transmission, low voltage charging, and the like. As such, the present disclosure should not be limited to any particular line voltage wiring device unless explicitly claimed. While the present disclosure describes and shows the wire terminals in combination with a line-voltage electrical device, it should be appreciated that the wire terminals may be used in connection with low-voltage electrical devices as well. Thus, the present disclosure should not be limited to line-voltage devices unless specifically claimed.

Figure 1B:
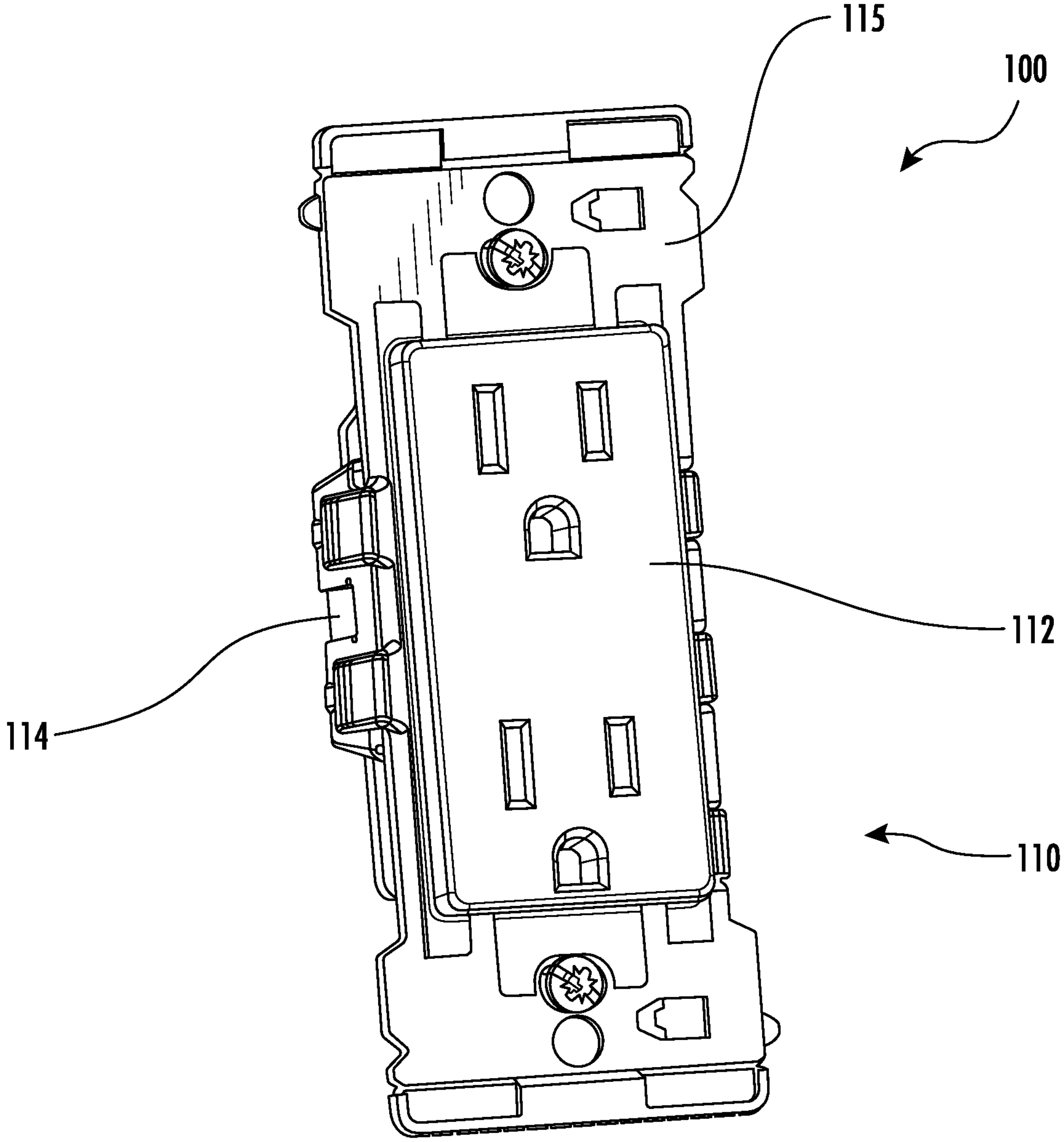

Referring to FIGS. 1A and 1B, an example embodiment of a wiring device 100 is shown. FIG. 1A illustrates the wiring device 100 along with a standard wallplate 102. FIG. 1B illustrates the wiring device 100 with the wallplate 102 removed. As will be appreciated by one of ordinary skill in the art, wiring devices 100 are normally fastened to electrical boxes positioned within a wall or ceiling of a building or in other suitable location. In addition, as will be appreciated by one of ordinary skill in the art, a wiring device 100 is arranged and configured to be inserted into wall boxes whose size is dictated by National Electrical Manufacturers Association ("NEMA"). For example, a wiring device 100 may include a housing 110 wherein the wiring device 100 is sized and configured as a single gang wall box mounted device. In various embodiments, the wiring device 100 also includes a strap 115. The housing 110 may include front and rear cover portions 112, 114 that, when assembled, enclose a variety of components, although the housing may include more portions or fewer portions.

Referring to FIGS. 2-8B, various embodiments of wire terminals 200 in accordance with one or more features of the present disclosure will be described. As will be appreciated by one of ordinary skill in the art, the wire terminal 200 may be incorporated into any line voltage wiring device such as, for example, wiring device 100.

As illustrated, in one embodiment, the wiring device 100 includes a housing 110, one or more contacts 130, and a wire terminal 200. The wire terminal 200 includes an actuating element or a lever 210 and a first or clamp spring 250. In addition, in various embodiments and as will be described in greater detail below, the wire terminal 200 may include a second or biasing spring or lever assist spring 270, 300 (FIGS. 10A-13C).

Figure 2:
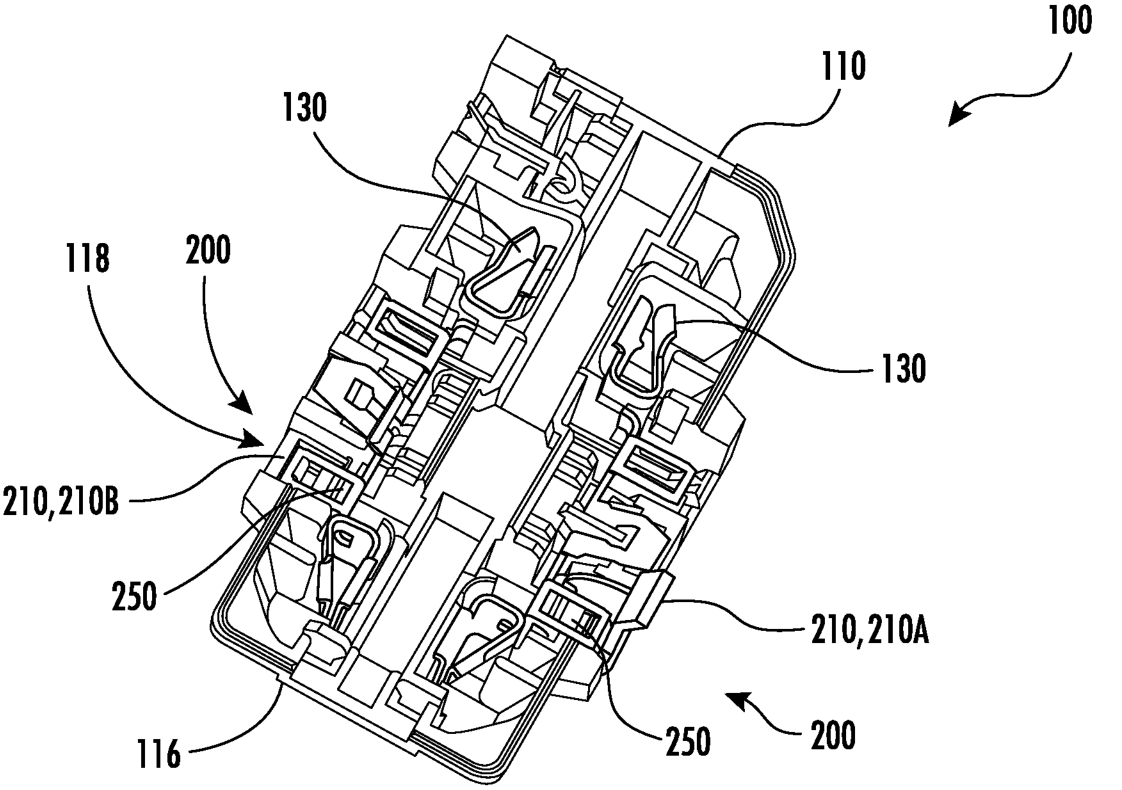
FIG. 2 illustrates a perspective view of an embodiment of an electrical wiring device with the front surface and other components omitted, the wiring device including contacts and first and second embodiments of wire terminals positioned within a housing of the wiring device in accordance with one or more features of the present disclosure.
Figure 3:
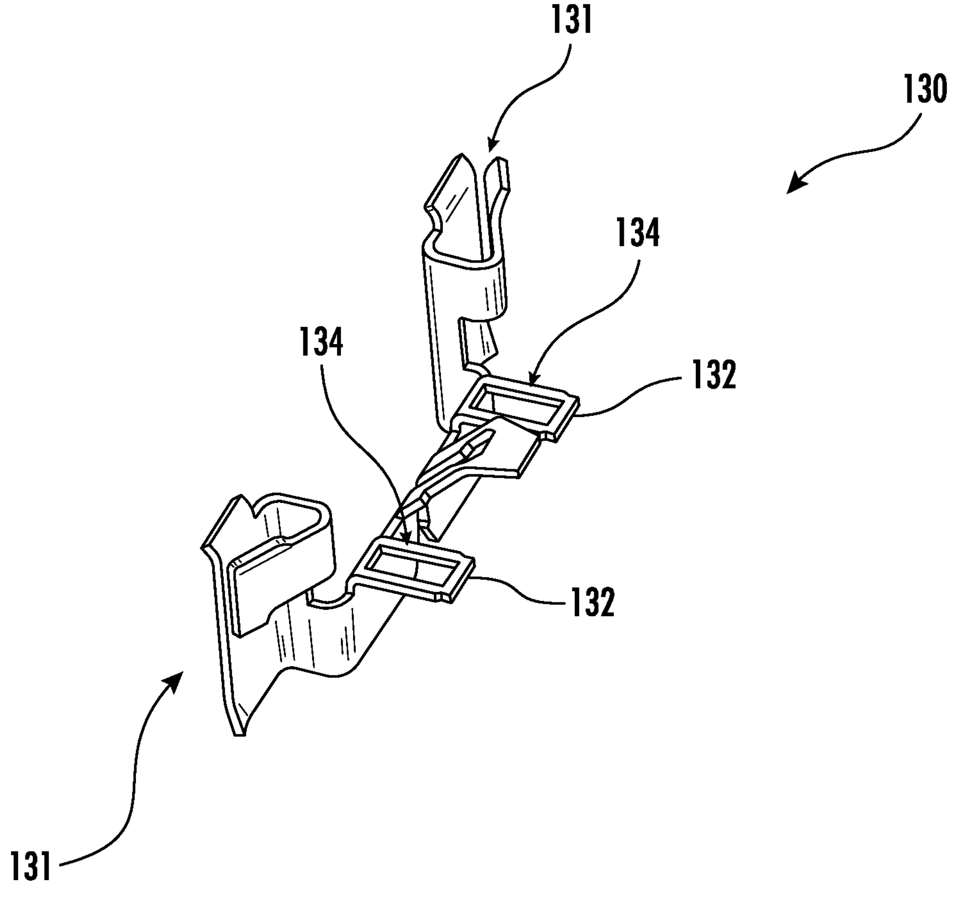
FIG. 3 illustrates a perspective view of the contact shown in FIG. 2.

With reference to FIGS. 2 and 3, the contacts 130 may have any suitable configuration or form now known or hereafter developed suitable for transferring incoming line-voltage from the electrical wire to a load coupled to the wiring device 100. As such, the present disclosure should not be limited to any particular configuration or form of contact. As will be appreciated by one of ordinary skill in the art, the configuration or form of the contact may be dependent on the wiring device. For example, as illustrated, in one embodiment, when used in a duplex style receptacle, the contacts 130 may include plug contact portions or receptacles 131 arranged and configured to engage a plug coupled thereto, or inserted into, the wiring device 100. Alternatively, when used in a switch, the contacts may include tabs arranged and configured to selectively provide power to the connected load depending on whether or not the switch is in the ON or OFF position.

As best illustrated in FIG. 3, in one embodiment, the contacts 130 include a cage or a laterally extending frame 132 (terms cage and frame used interchangeably without the intent to limit or distinguish) including an opening 134 arranged and configured to receive an end of the electrical wire so that the electrical wire can be inserted into and contact the contact 130 to transfer the line-voltage from the electrical wire to the contact 130. As will be described in greater detail herein, the contact 130 is arranged and configured to receive, couple, etc. a first or clamp spring 250 for securing an electrical wire to the contact 130. In addition, the contact 130 is arranged and configured to accept plug blades in the case of the wiring device being a receptacle.

With reference to FIGS. 4-8B, in use, the clamp spring 250 of the wire terminal 200 is partially positioned within the cage 132. As will be described in greater detail herein, with the clamp spring 250 partially positioned within the opening 134 of the cage 132, the clamp spring 250 and the opening 134 define an electrical wire receiving space S for receiving an end of the electrical wire.

As illustrated, the wire terminal 200 includes a lever 210. In use, the lever 210 may have any suitable form. For example, as generally described and illustrated herein, the lever 210A may be provided in a first embodiment as generally illustrated on the right-hand side of each FIG. or the lever 210B may be provided in a second embodiment as generally illustrated in the left-hand side of each FIG. Regardless of the lever 210 being used, in use, the lever 210 is moveable between a first position (illustratively shown in FIGS. 7A and 7B) and a second position (illustratively shown in FIGS. 8A and 8B). In one embodiment, as illustrated, the lever 210 may be vertically pivotable (e.g., axis of the pivot pin may extend parallel to a longitudinal axis of the strap 115). In use, as will be appreciated by one of ordinary skill in the art, the lever 210 extends from the housing 110 of the wiring device 100 so that, during installation, a user may move the lever 210 from the first position to the second position to insert an electrical wire into the electrical wire receiving space S. Thereafter, once the electrical wire has been inserted, the user may move the lever 210 from the second position to the first position to retain the wire within the wire terminal 200 and abutting a face of the contact 130. As will be discussed in greater detail, moving the lever 210 from the first position to the second position biases (e.g., applies a force to) the clamp spring 250, which enlarges the electrical wire receiving space S to receive the electrical wire. Thereafter, once the wire has been properly positioned within the electrical wire receiving space S, moving the lever 210 from the second position to the first position enables the clamp spring 250 to return to its natural, at rest position, which applies a clamping force to the wire positioned within the electrical wire receiving space S, thereby securing or coupling the wire against the contact 130.

That is, once the wire is installed into the electrical wire receiving space S, the lever 210 may be pivoted to the first position. In the first position, the lever 210 and/or the clamp spring 250 may be arranged and configured to apply a force to retain the wire within the electrical wire receiving space S and to ensure that the wire remains in contact with the contact 130 of the wiring device 100. That is, in the first position, the clamp spring 250 and/or the lever 210 are arranged and configured to provide a desired retention force to maintain the electrical wire within the electrical wire receiving space S (e.g., the clamp spring 250 is arranged and configured to press against the installed electrical wire and to press or bias the electrical wire against the contact 130). In one embodiment, the biasing element or clamp spring 250 is arranged and configured to apply a force onto the lever 210 to maintain the lever 210 in the first position once the lever 210 has moved a certain amount or percentage from the second position.

In addition, in one embodiment, the clamp spring 250 may also be arranged and configured to "cut" into the electrical wire to ensure contact is maintained as will be described in greater detail below.

In accordance with one or more features of the present disclosure, the wiring device 100 may include a housing 110 having an aperture 118 formed in a rear surface 116 thereof. In use, the aperture 118 is arranged and configured to receive the electrical wire therein. In addition, the aperture 118 is aligned with the opening 134 formed in the cage 132 so that when the electrical wire is inserted through the aperture 118, the wire can be received within the electrical wire receiving space S when the lever 210 is in the second position.

Figure 4:
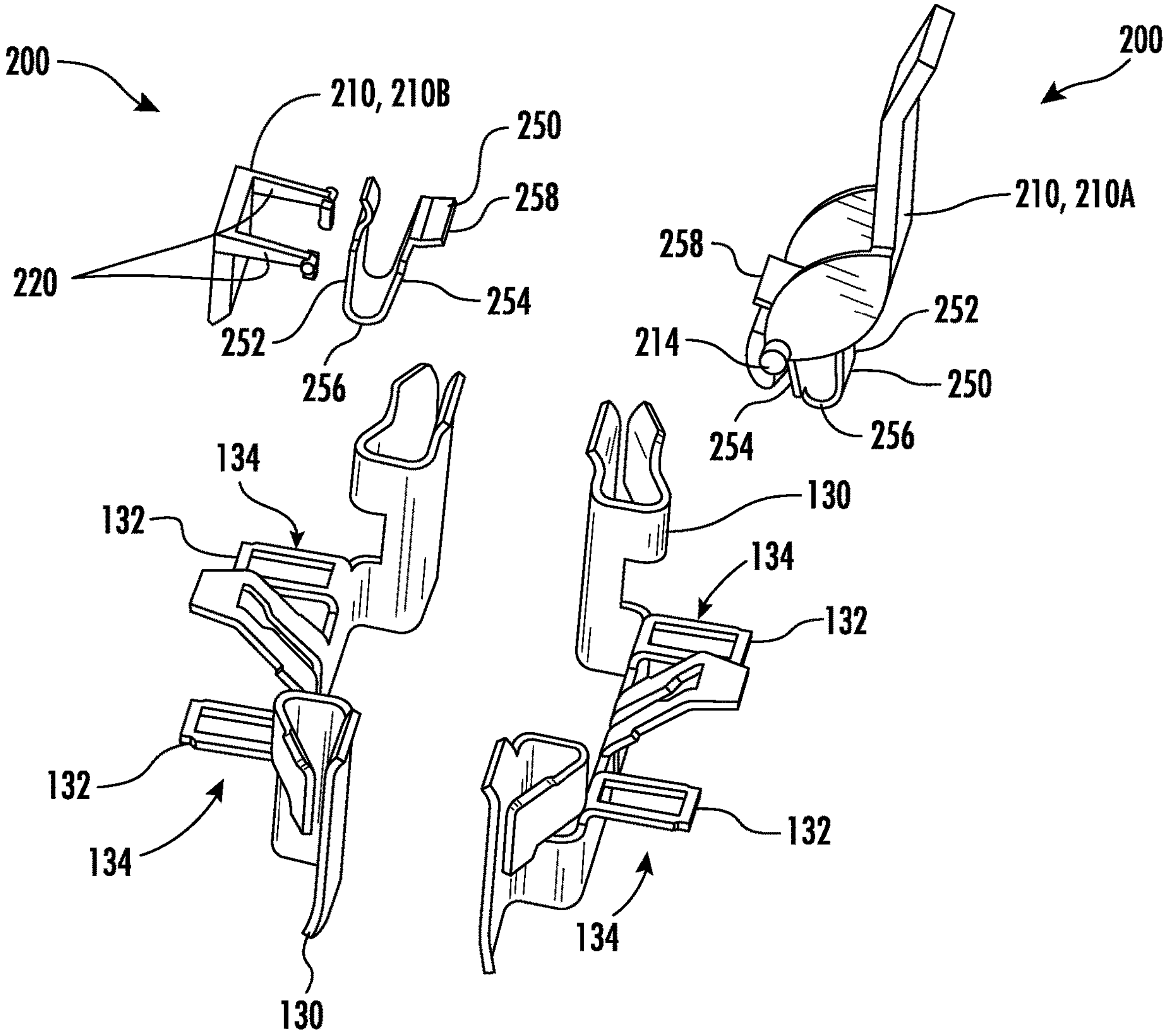
FIG. 4 illustrates an exploded perspective view of the contact and the first and second embodiments of the wire terminals shown in FIG. 2.
Figure 5:
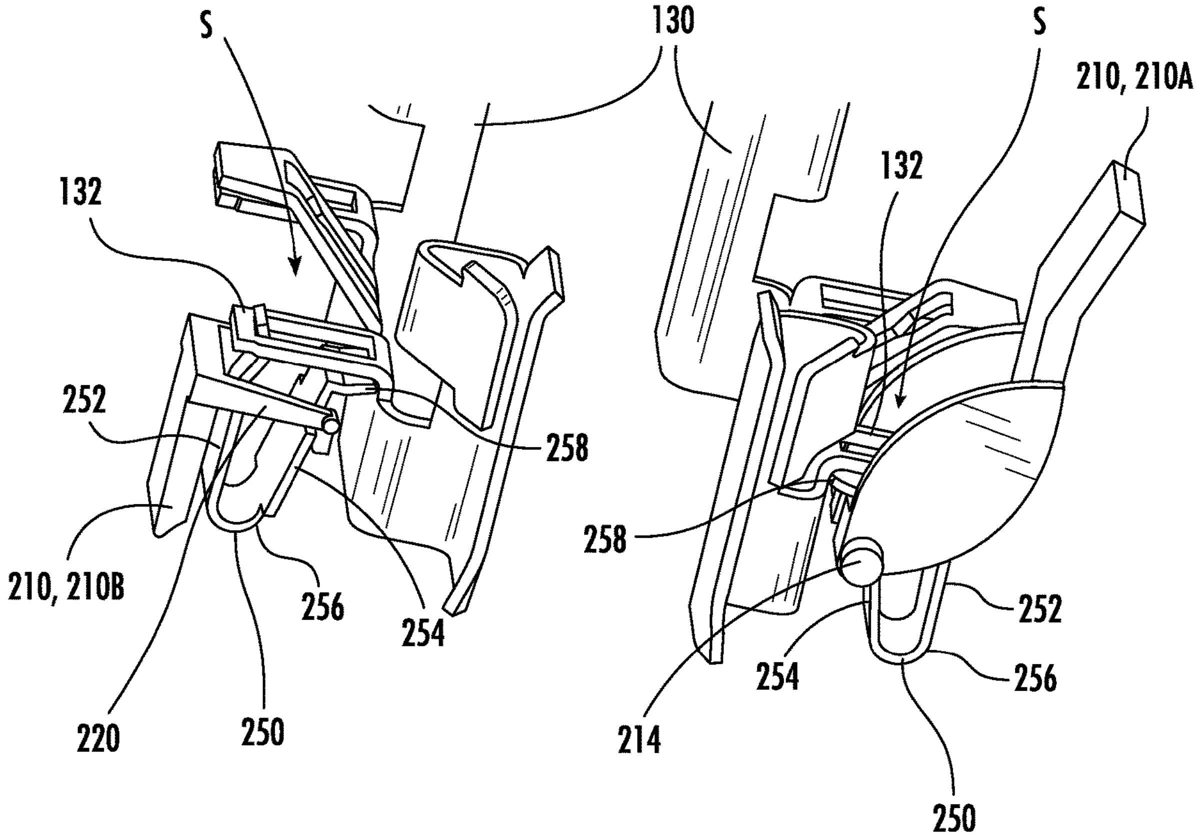
FIG. 5 illustrates a detailed perspective view of the contact and the first and second embodiments of the wire terminals shown in FIG. 2.
Figure 6:
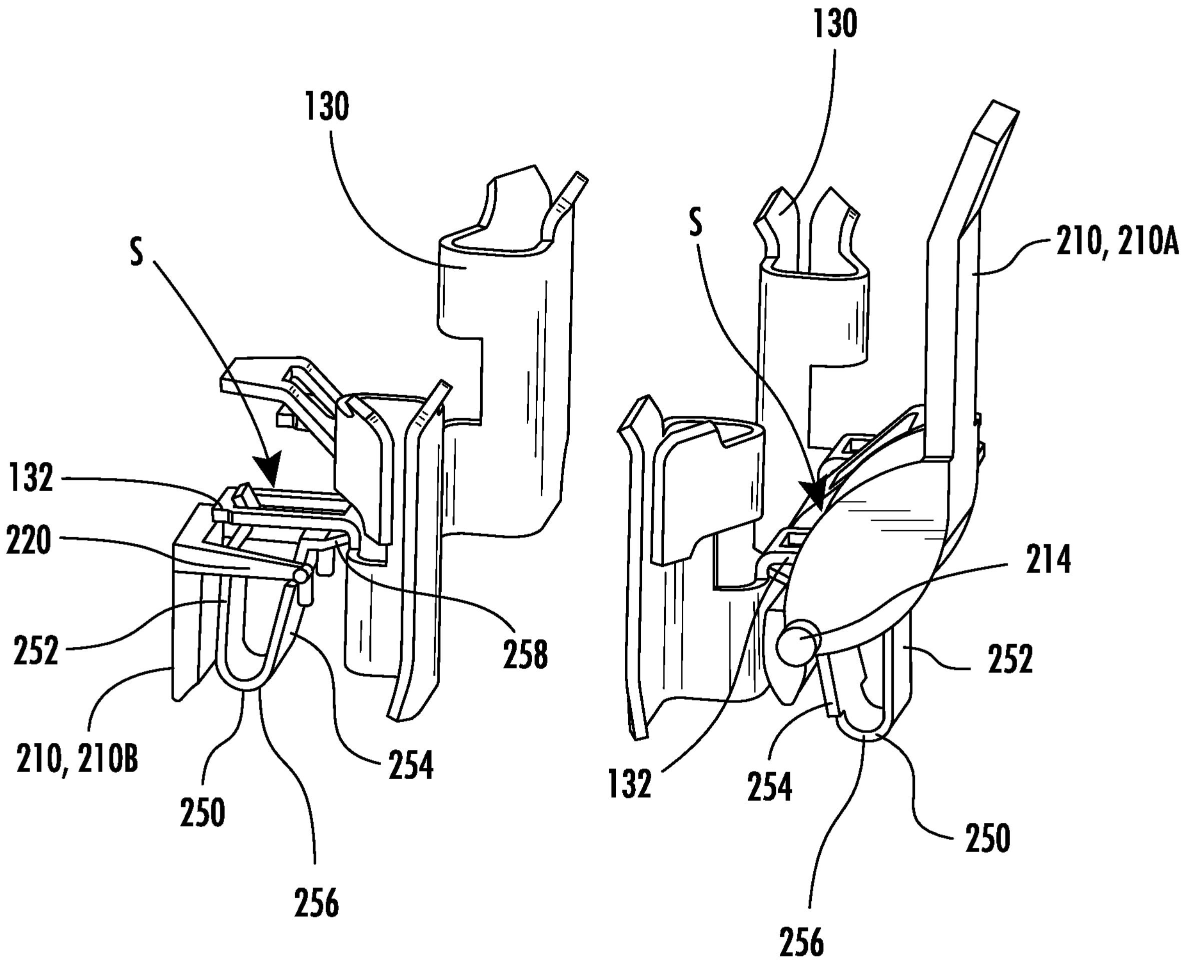
FIG. 6 illustrates an alternate perspective view of the contact and the first and second embodiments of the wire terminals shown in FIG. 2.
Figure 7A:
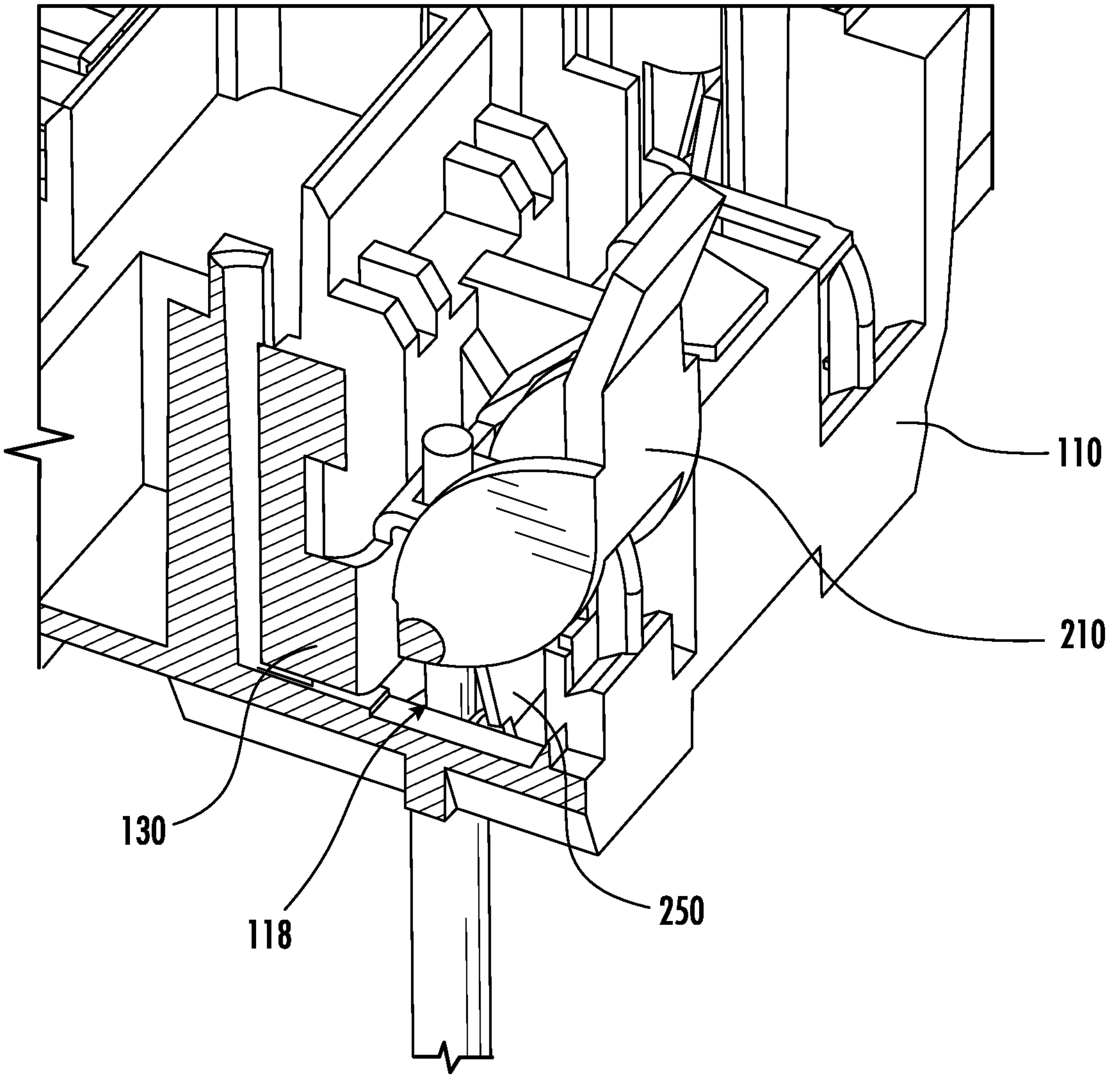
FIGS. 7A and 7B illustrate an embodiment of a wire terminal in accordance with one or more features of the present disclosure, the wire terminal being in a first position.
Figure 7B:
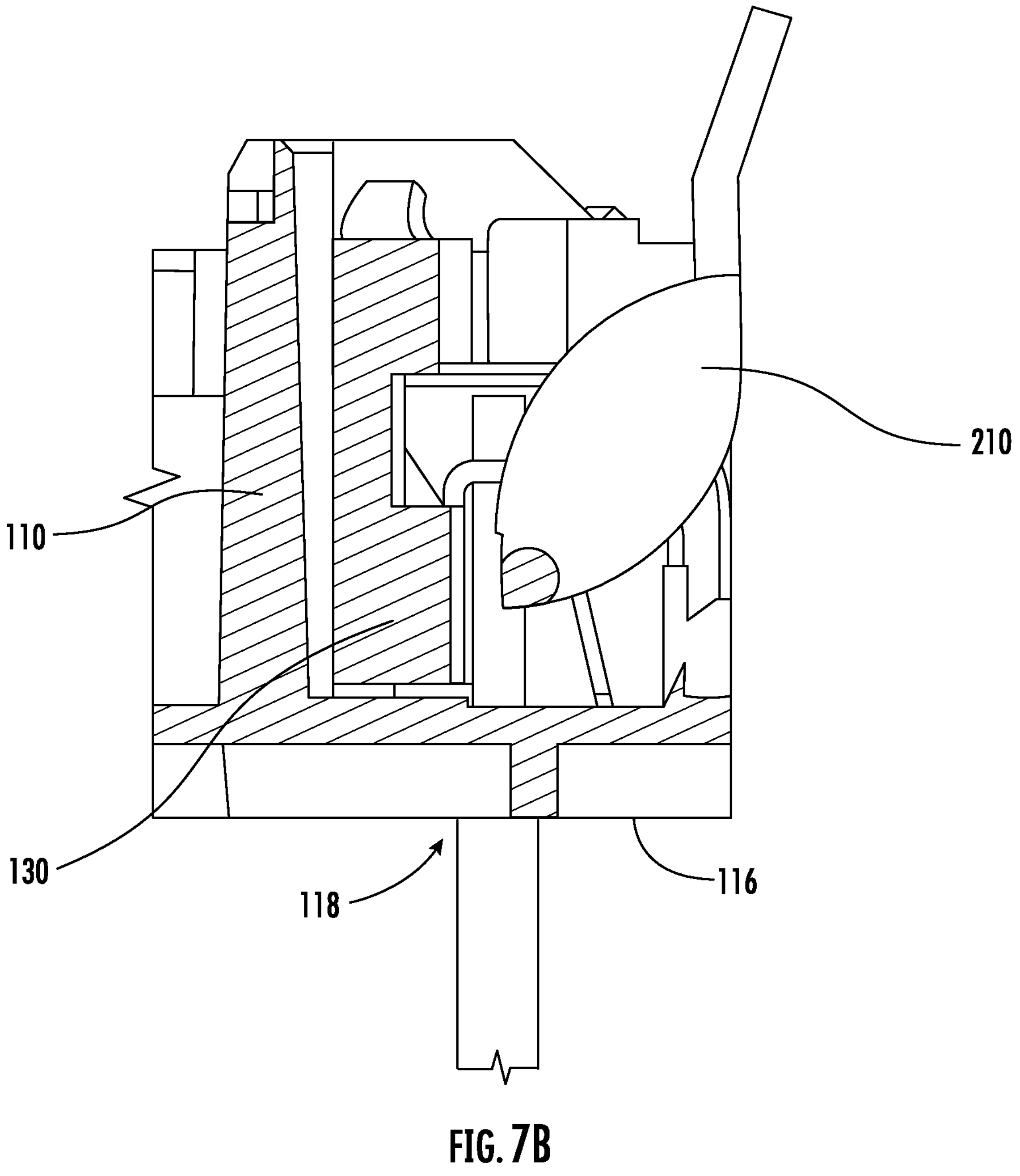
Figure 8A:
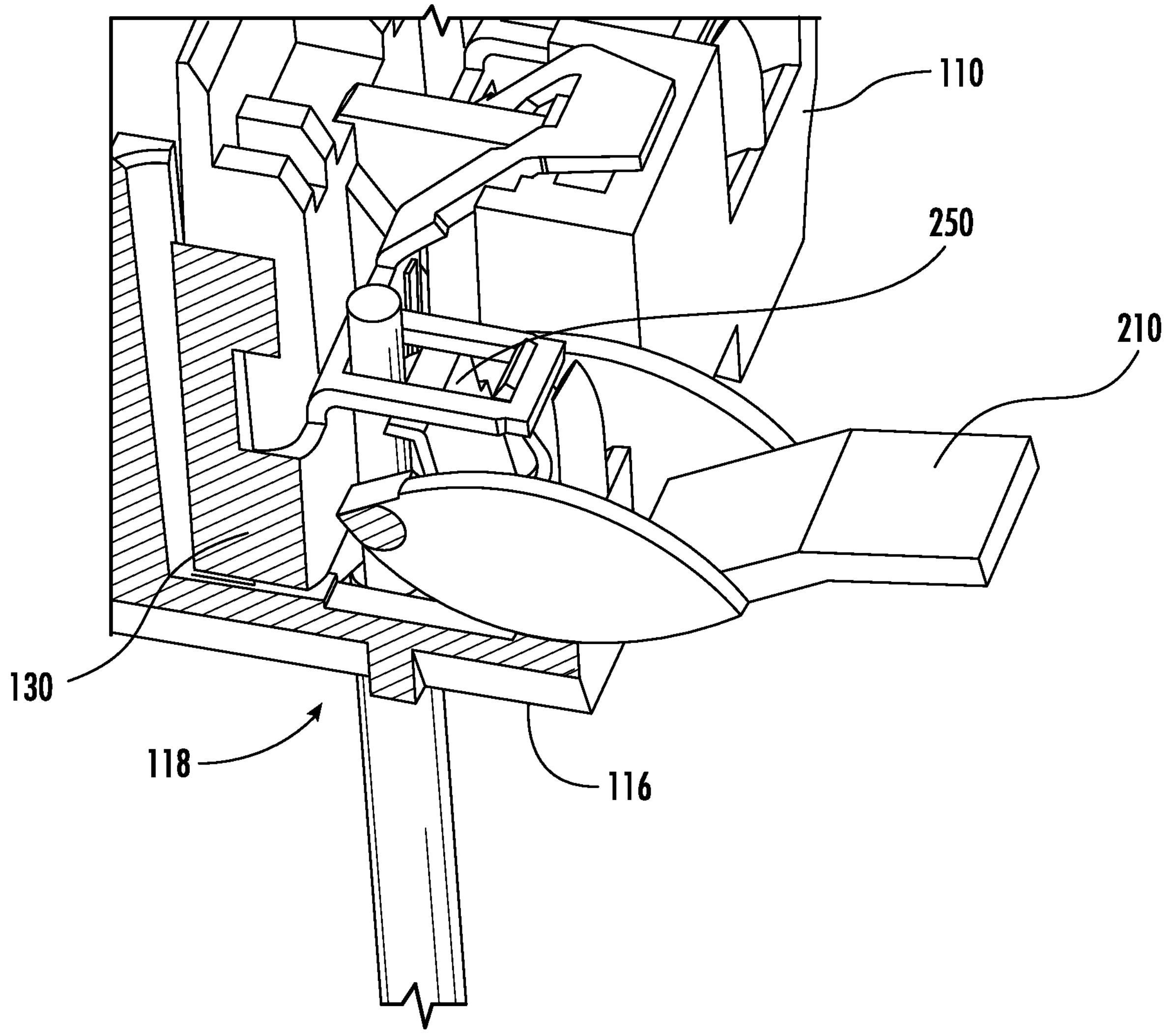
FIGS. 8A and 8B illustrate the wire terminal shown in FIGS. 7A and 7B, the wire terminal being in a second position.
Figure 8B:
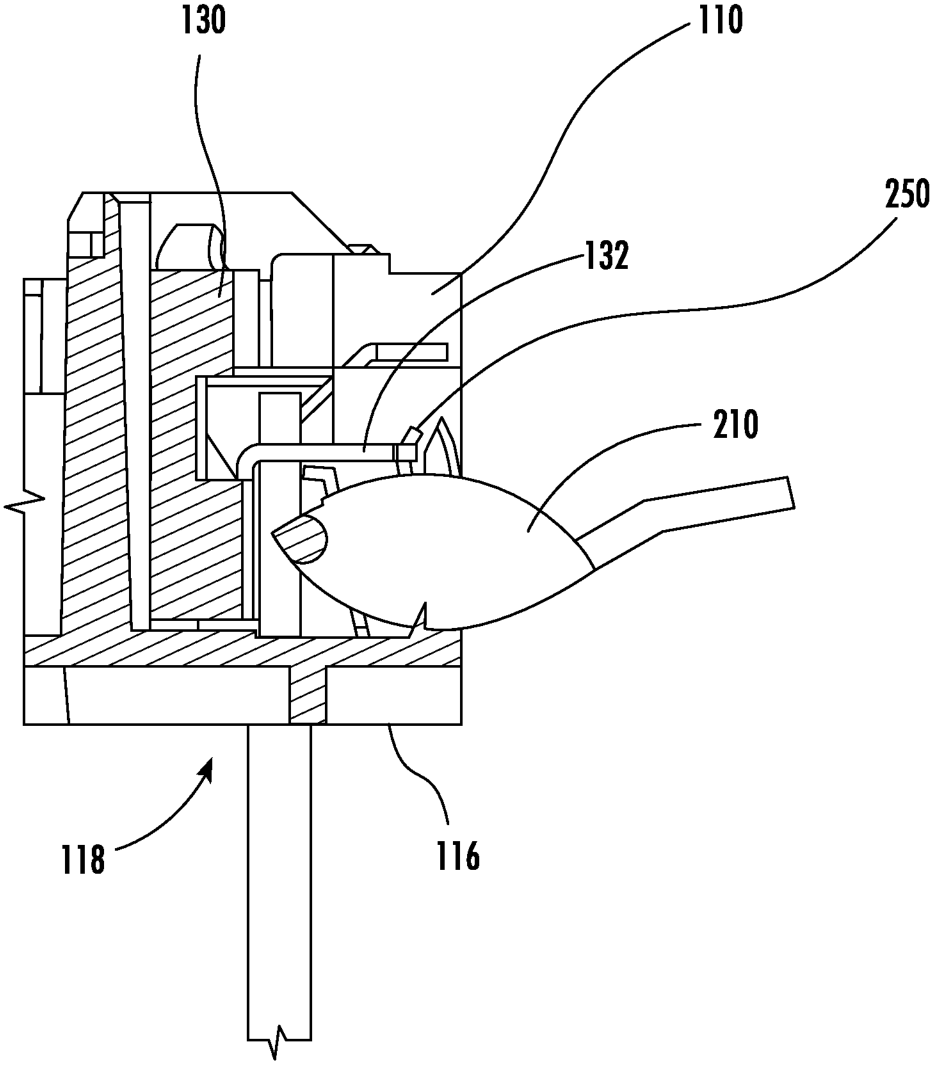
Figure 9:
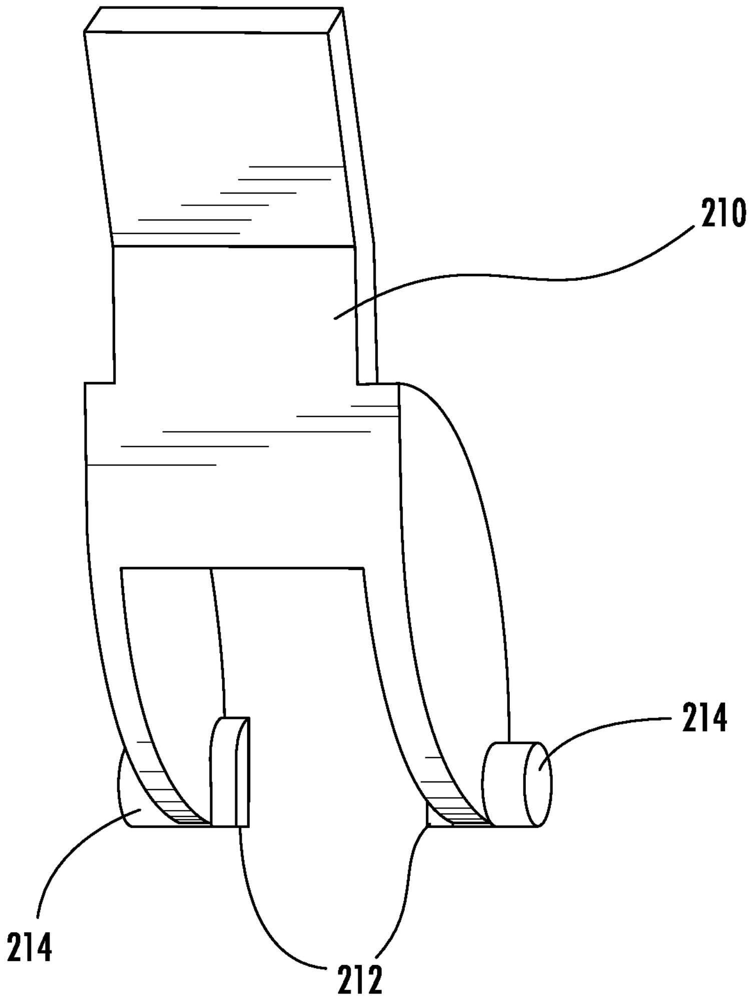
FIG. 9 illustrates a perspective view of an embodiment of a lever used in the wire terminal shown in FIGS. 7A-8B.
Figure 10A:
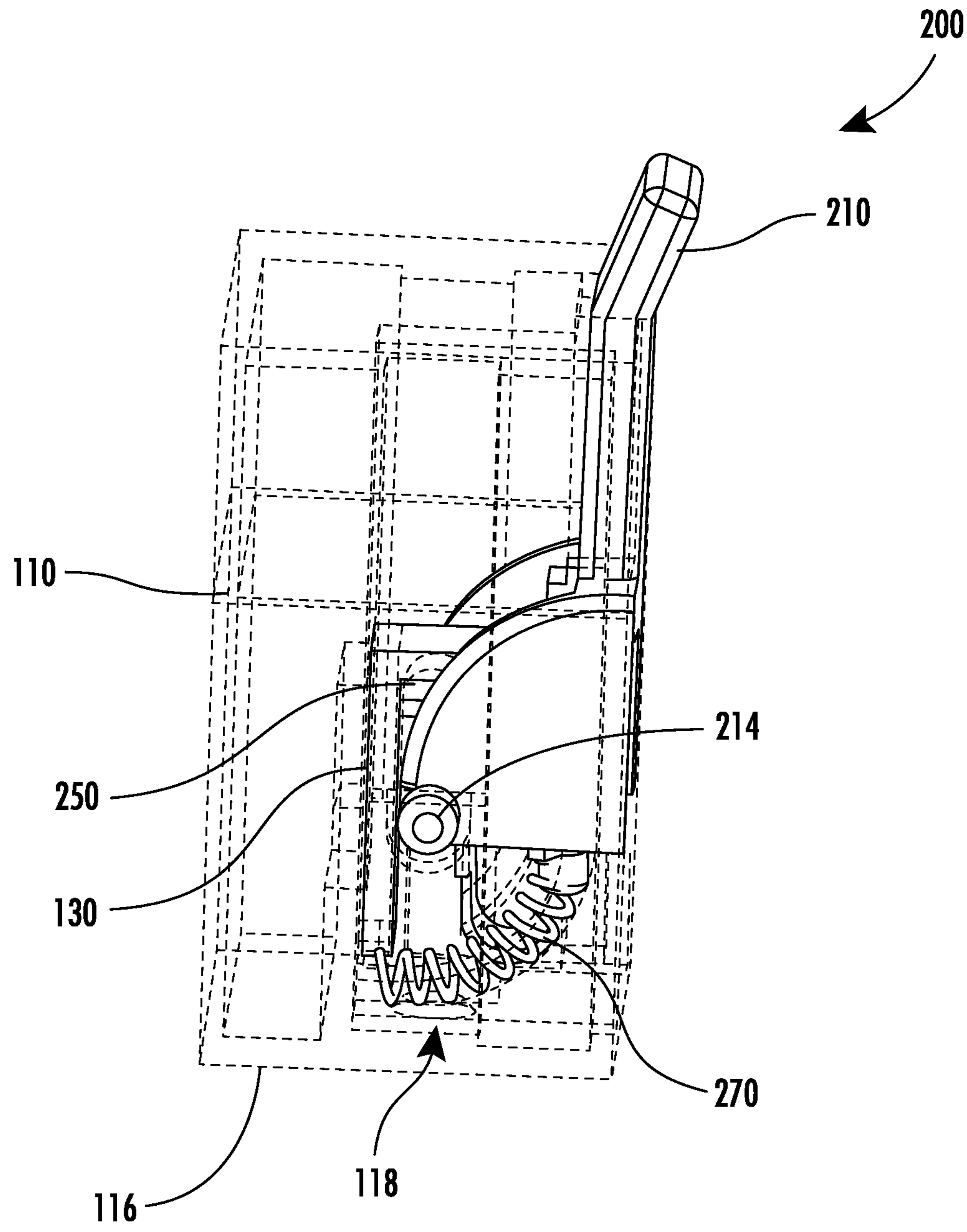
FIGS. 10A and 10B illustrate various views of an embodiment of a second or biasing spring that may be used in connection with a wire terminal in accordance with or features of the present disclosure.
Figure 10B:
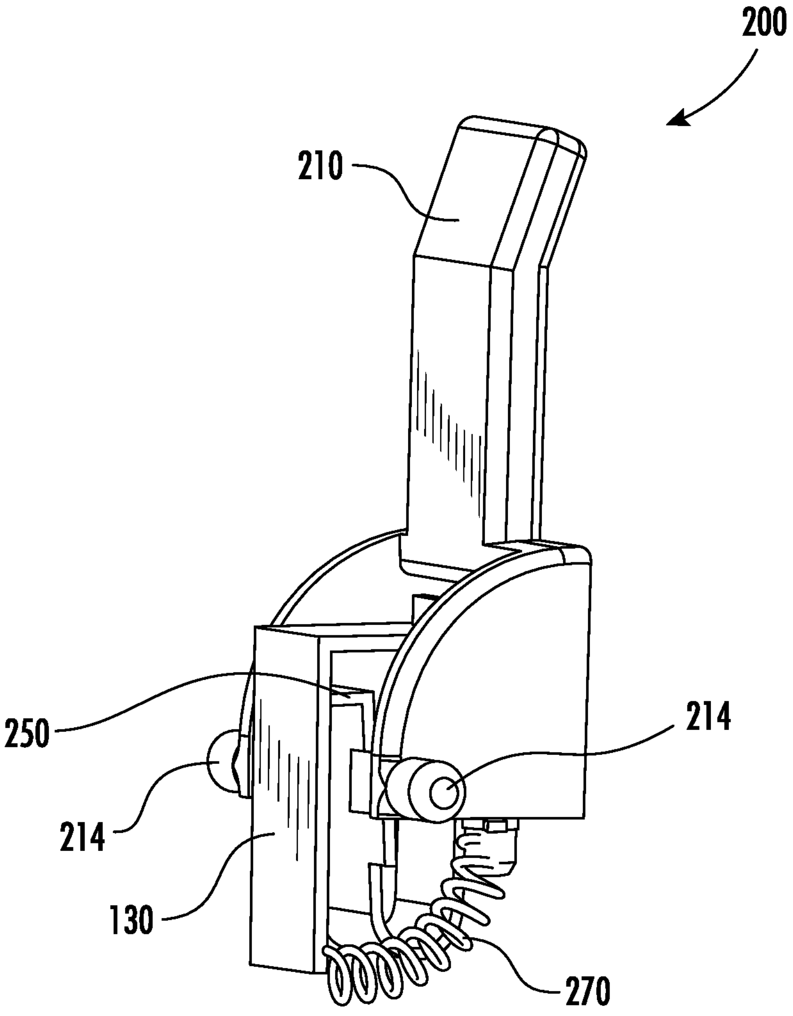
Figure 11A:
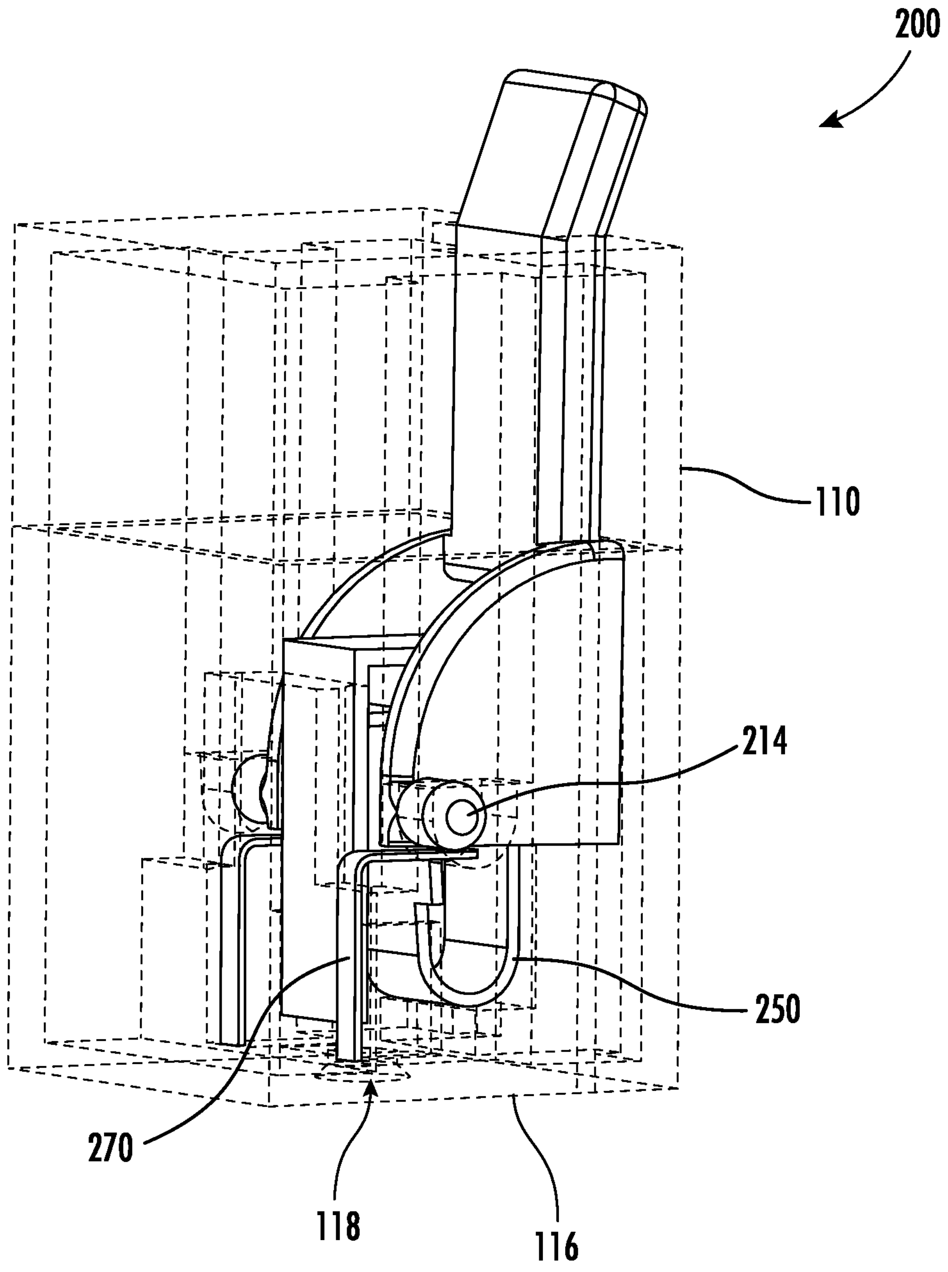
FIGS. 11A and 11B illustrate various views of an alternate embodiment of a second or biasing spring that may be used in connection with a wire terminal in accordance with or features of the present disclosure.
Figure 11B:
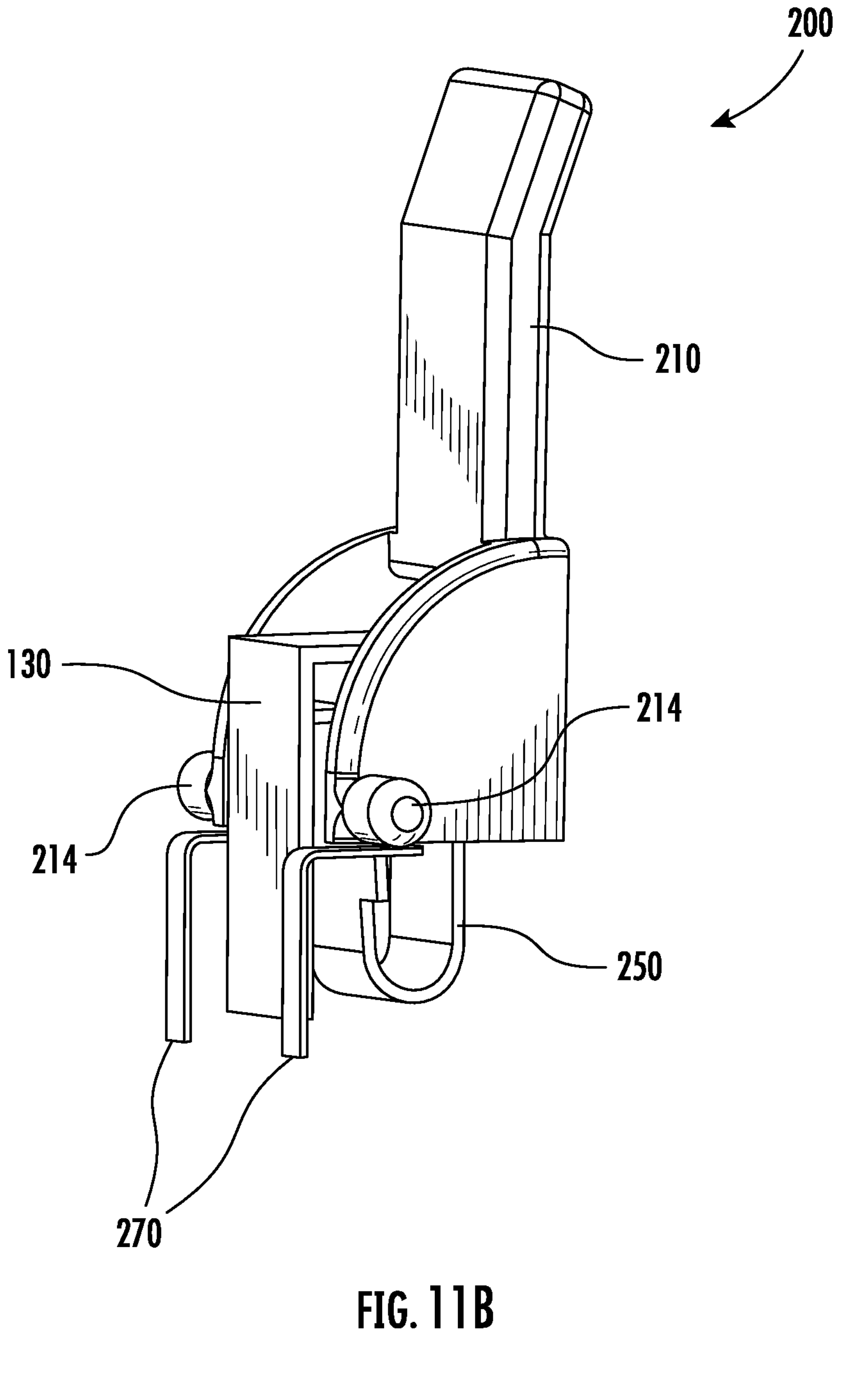
Figure 12A:
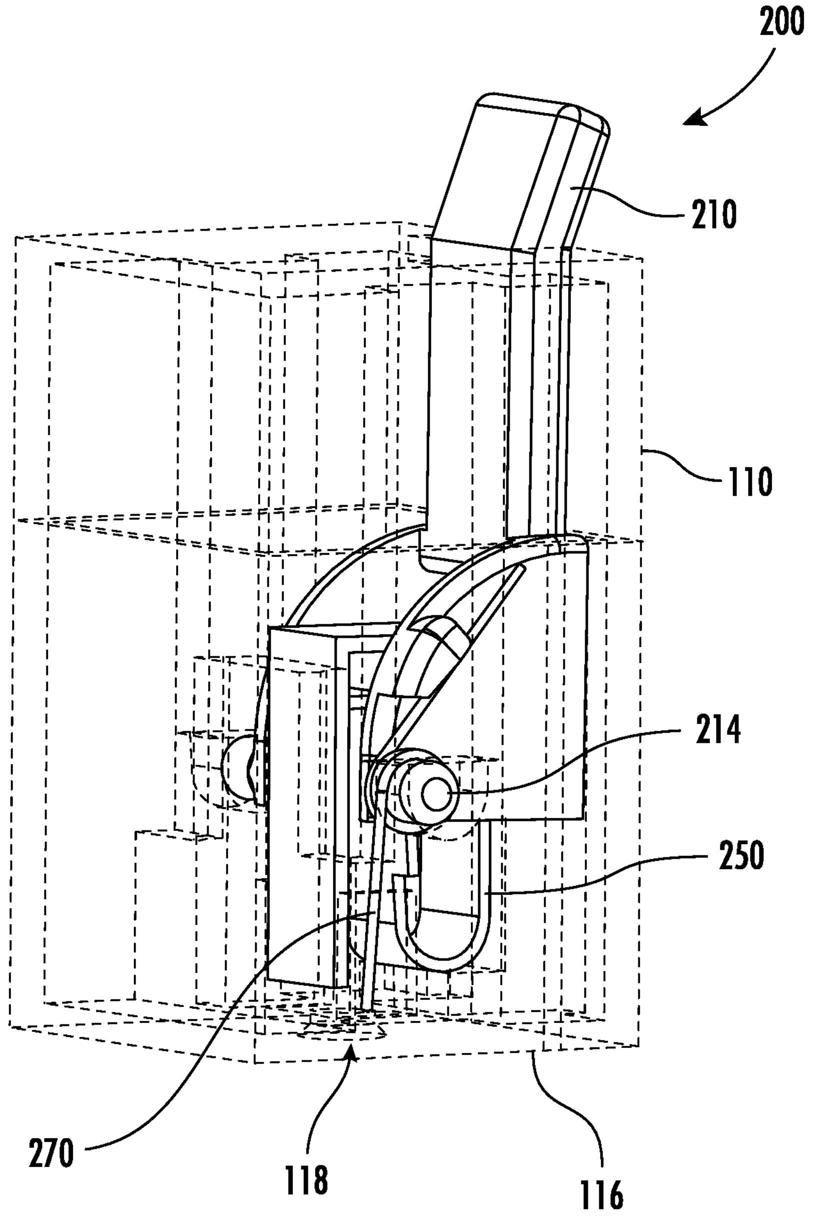
FIGS. 12A and 12B illustrate various views of an alternate embodiment of a second or biasing spring that may be used in connection with a wire terminal in accordance with or features of the present disclosure.
Figure 12B:
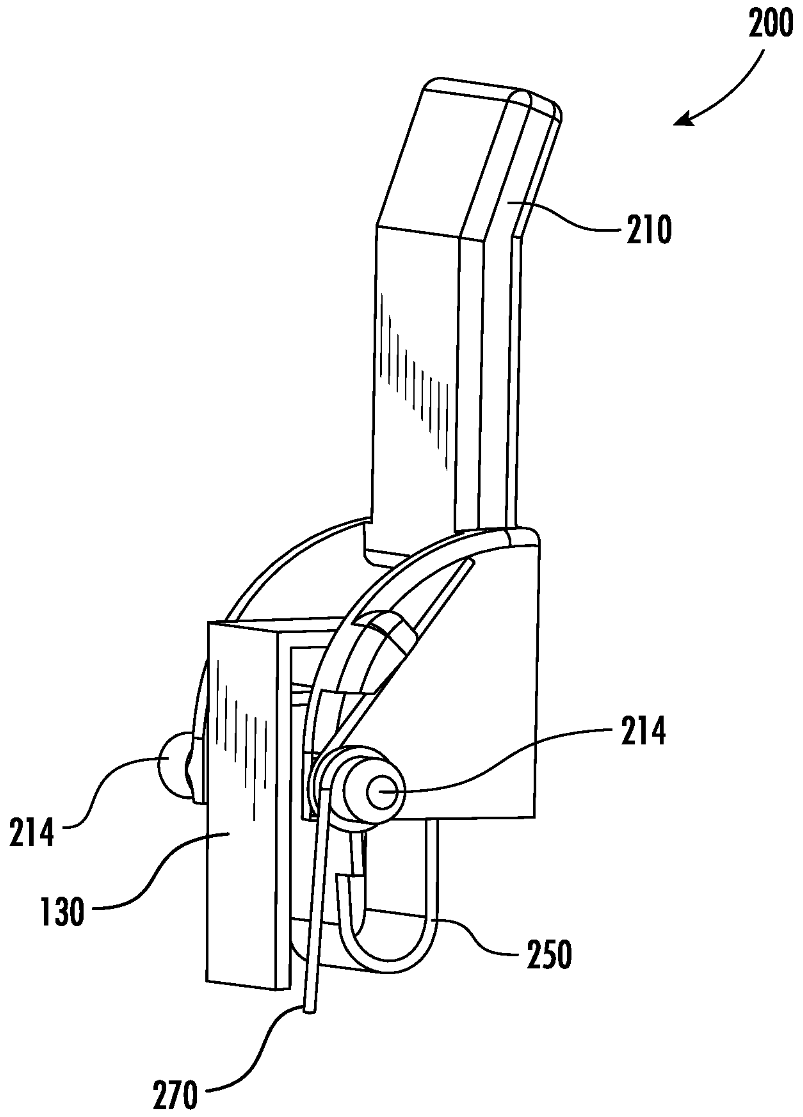

With reference to FIGS. 4-6, the clamp spring 250 includes a first leg 252, a second leg 254, and a bend 256, wherein the bend 256 couples the first and second legs 252, 254. In use, movement of the lever 210 from the first position to the second position, causes the first and second legs 252, 254 of the clamp spring 250 to move relative to each other to enlarge the electrical wire receiving space. For example, with reference to FIGS. 7A-9, in one embodiment, moving the lever 210 from the first position to the second position, causes a bearing surface 212 formed on the lever 210 to contact a surface on the clamp spring 250 such as, for example, the second leg 254 of the clamp spring 250, which moves a stab or sharpened edge 258 (as will be described in greater detail below) of the clamp spring 250, unblocking the opening 134 formed in the cage 132 and/or compressing the second leg 254 of the clamp spring 250 towards the first leg 252 of the clamp spring 250. In either event, moving the lever 210 from the first position to the second position enlarges the electrical wire receiving space S for receiving the electrical wire. Thereafter, once the electrical wire has been properly inserted into the electrical wire receiving space S, moving the lever 210 from the second position to the first position (e.g., user pivots the lever 210 from the second position to the first position), causes the second leg 254 of the clamp spring 250 to bias the inserted electrical wire against the contact 130. In one embodiment, as illustrated, the second leg 254 of the clamp spring 250 may include a projection, a stab, a sharpened edge 258 (terms used interchangeably herein without the intent to limit or distinguish) extending from the clamp spring 250, the stab 258 being arranged and configured to engage or bite into the electrical wire to provide additional retention force in maintaining the wire in the electrical wire receiving space S in the first position. Incorporation of the stab 258 creates a sharp edge to provide increased pressure to provide improved securement of the electrical wire.

With continued reference to FIGS. 4-9, in one embodiment, the lever 210A may be pivotably coupled to the housing 110 via pivot pins 214. In use, the bearing surface 212 may be provided on an inner surface of the lever 210A. Movement of the lever 210A from the first position to the second position causes the bearing surface 212 to contact the second leg 254 of the clamp spring 250 thereby pushing the stab or sharpened edge 258 of the second leg 254 of the clamp spring 250 out of the way of the opening 134 formed in the cage 132 thereby enlarging the electrical wire receiving space S formed in the wire terminal 200. Alternatively, the lever 210B may include first and second arms 220 extending laterally therefrom. In use, the first and second arms 202 may be arranged and configured to engage the second leg 254 of the clamp spring 250 so that movement of the lever 210B from the first position to the second position causes the second leg 254 of the clamp spring 250 to be drawn towards the first leg 252 of the clamp spring 250 thereby enlarging the electrical wire receiving space S.

Referring to FIGS. 10A-13C, in accordance with one or more features of the present disclosure, the wire terminal 200 may also include a biasing spring 270 arranged and configured to bias the lever 210 to the first position. Thus arranged, the biasing spring 270 is arranged and configured to assist with maintaining the lever 210 in the first position, and thus prevent, or at least inhibit, inadvertent actuation or movement of the lever 210 to the second position during, for example, insertion of the wiring device 100 into the wall box. In other words, the lever 210 and the biasing spring 270, together act similar to an over-center mechanism where the first and second positions are stable positions, when the lever 210 is at any point in its range of motion between the first and second positions, the lever 210 is biased to "snap" to either the first or second positions. In use, the biasing spring 270 is arranged and configured to take up any play or slack in the lever 210 caused by insertion of the electrical wire into the electrical wire receiving space S defined by the clamp spring 250 and opening 134 formed in the cage 132. That is, in use and as previously described herein, the clamp spring 250 is acted upon by features disposed on the lever 210 (e.g., bearing surface 212) that may act to pull or move the lever 210 away from the contact 130. The biasing spring 270 acts to bias the lever 210 to the first position when a wire is inserted into the electrical wire receiving space S thereby assisting with removing any play or slack in the lever 210 occurring due to repositioning or reorientation of the clamp spring 250 due to the electrical wire being positioned within the electrical wire receiving space S. In other words, the biasing spring 270 removes any displacement of the lever 210 from its first position that would otherwise be created due to the presence of the electrical wire within the electrical wire receiving space S.

In use, the biasing spring 270 may bias the lever 210 to the first position. Thus arranged, in use, the lever 210 may be moved from the first position to the second position. In the second position, an electrical wire receiving space S is created or enlarged to enable a user to insert the electrical wire into the wire terminal 200 (e.g., in the second position, the electrical wire receiving space S may be enlarged a sufficient amount so that the electrical wire can be freely inserted into the electrical wire receiving space S without undue interference or resistance). In one embodiment, at least a portion of the clamp spring 250 is moved away from the contact 130 thereby creating or enlarging the electrical wire receiving space S for the electrical wire to be inserted when the lever 210 is in the second position. The biasing spring 270 ensures, or at least minimizes, the likelihood that the lever 210 can move to the second position inadvertently during, for example, insertion of the wiring device 100 into a wall box, which may otherwise cause the electrical wire to free itself from the wiring device 100. In addition, the biasing spring 270 may assist with providing increased retention force to maintain the electrical wire within the electrical wire receiving space S (e.g., in the first position, with the electrical wire positioned within the electrical wire receiving space S, the biasing spring 270 may provide increased retention force on the wire against the contact 130).

The biasing spring 270 may have any suitable form and/or configuration to bias the lever 210 to the first position. For example, referring to FIGS. 10A and 10B, the biasing spring 270 may be in the form of a compression spring (e.g., a coil spring). In use, the compression spring may run from the housing 110 to the lever 210 (e.g., a first end of the compression spring may be coupled to, or in contact with, the housing 110 while a second end of the compression spring may contact the lever 210 to exert a force to bias the lever 210 to the first position). In use, the biasing spring 270 is arranged and configured to bias the lever 210 to the first position.

Alternatively, the biasing spring 270 may be provided in alternate forms. For example, referring to FIGS. 11A and 11B, the biasing spring 270 may be in the form of a leaf spring. In use, the leaf spring may run from the housing 110 to the lever 210 such as, for example, to the pivot pin 214 formed on the lever 210 (e.g., the leaf spring may include a first leg and a second leg, the first leg of the leaf spring being in contact with the housing, the second leg of the leaf spring contacting the lever to exert a force to bias the lever to the first position). In use, the biasing spring 270 is arranged and configured to bias the lever 210 to the first position. Alternatively, referring to FIGS. 12A and 12B, the biasing spring 270 may be in the form of a torsion spring. In use, the torsion spring may run from the housing 110 to the lever 210 such as, for example, to the pivot pin 214 formed on the lever 210 (e.g., the torsion spring may include a first segment and a second segment, the first segment of the torsion spring being in contact with the housing, the second segment of the torsion spring contacting the lever to exert a force to bias the lever to the first position). In use, the biasing spring 270 is arranged and configured to bias the lever to the first position by urging the pivot pin to rotate.

As previously mentioned, in accordance with one or more features of the present disclosure, the wiring device 100 may also include a retention element or mechanism (terms used interchangeably herein) for restraining a portion or a free end of the electrical wire once it has been positioned within or entered the housing 110 of the wiring device 100 (e.g., to restrain a portion of the electrical wire within the housing). That is, the wiring device 100 may include a secondary, retention element, mechanism or a second point of contact for gripping, engaging, holding, or contacting the electrical wire upon entry into the aperture 118 formed in the rear surface 116 of the housing 110. As will be appreciated by one of ordinary skill in the art, the electrical wire may include conductors (e.g., copper) and insulation (e.g., plastic) surrounding the conductors, in use, the retention element may be arranged and configure to contact either the conductor or the insulation.

Figure 13A:
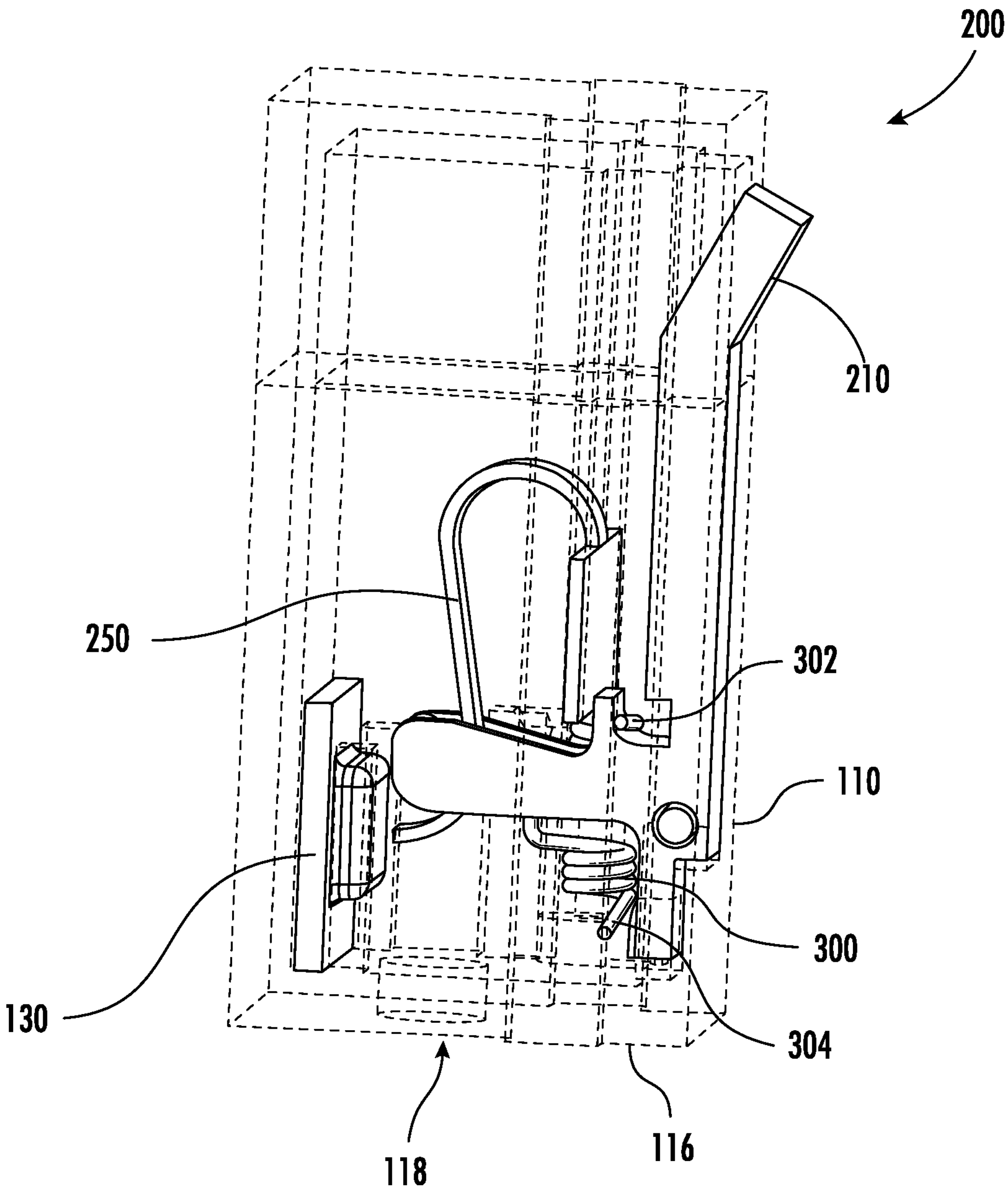
FIGS. 13A-13C illustrate various views of an alternate embodiment of a second or biasing spring that may be used in connection with a wire terminal in accordance with or features of the present disclosure.
Figure 13B:
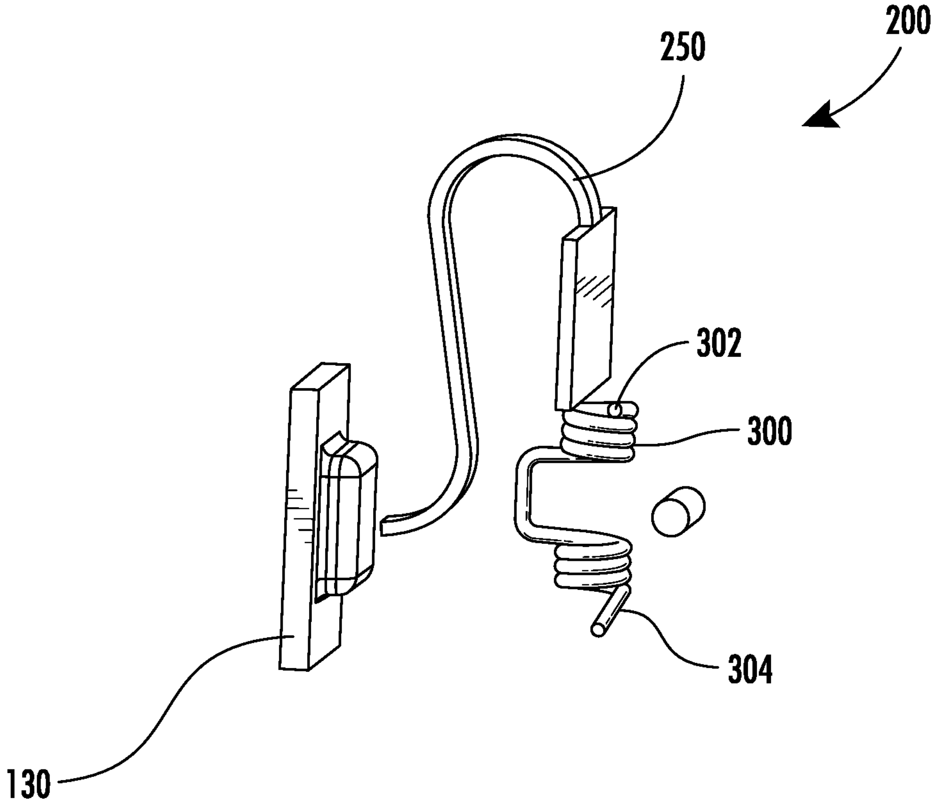
Figure 13C:
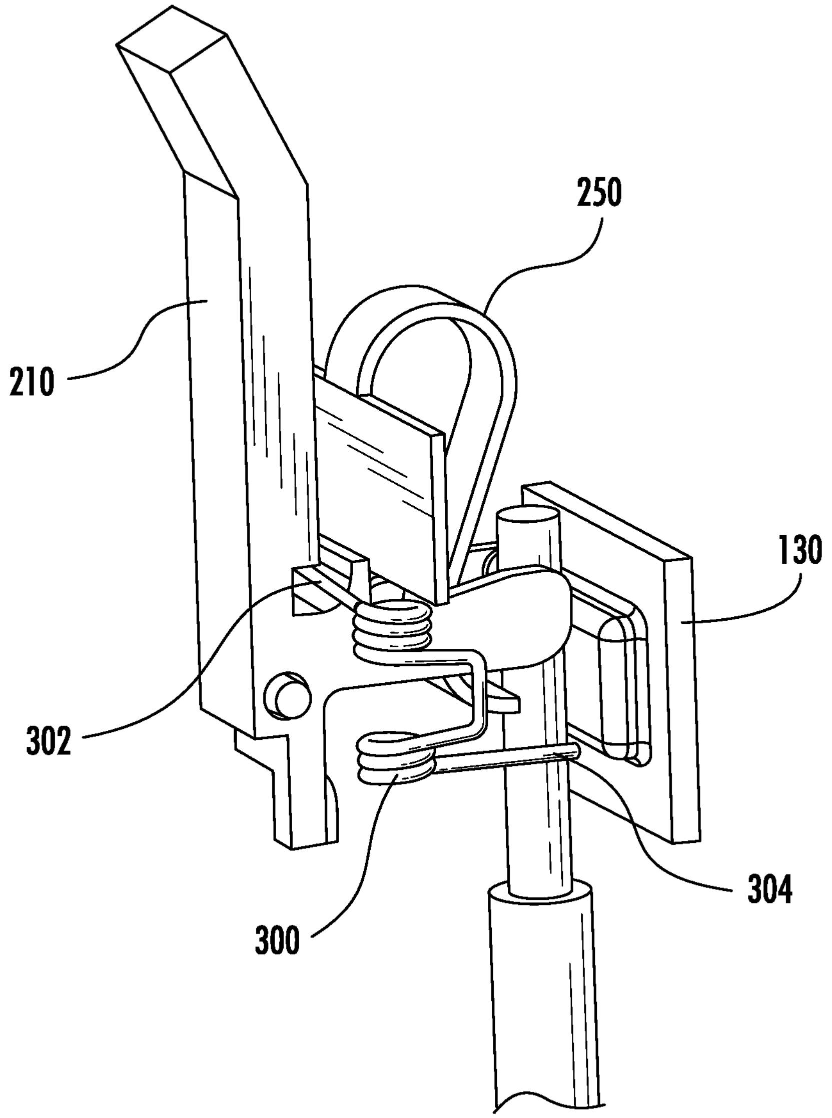

For example, referring to FIGS. 13A-13C, in one embodiment, the wiring device 100 may include a double torsion spring 300 including a first or top arm 302 and a second or bottom arm 304. The double torsional spring 300 may be arranged and configured to bias the lever 210 to the first position (and thus act similar to the biasing springs discussed above in connection with FIGS. 10A-12B) and to retain the electrical wire within the aperture 118 formed in the rear surface 116 of the housing 110. In one embodiment, as illustrated, the first or top arm 302 and the second or bottom arm 304 may extend horizontally (e.g., parallel to a longitudinal axis of the strap 115). In use, movement of the lever 210 from the first position to the second position causes the bearing surface 212 formed on the lever 210 to contact the second or bottom arm 304 of the torsion spring 300 causing the second or bottom arm 304 to compress or pivot (e.g., moves the second or bottom arm 304 to a second position) thereby allowing the user to insert an electrical wire through the aperture 118 formed in the rear surface 116 of the housing 110. Thereafter, movement of the lever 210 from the second position to the first position, releases the second or bottom arm 304 of the torsion spring 300. However, thus arranged, as illustrated in FIG. 13C, the second or bottom arm 304 of the torsion spring 300 contacts a backside of the inserted electrical wire, thus facilitating securing, holding, etc. the position of the wire within the housing 110 of the wiring device 100 (e.g., second or bottom arm 304 of the torsion spring 300 creates a second point of contact against the electrical wire to hold the wire within the wiring device 100). The first or top arm 302 of the torsional spring 300 is arranged and configured to contact the lever 210 to bias the lever 210 to the first position.

That is, in use, movement of the lever 210 from the first position to the second position deflects the second or bottom arm 304 (e.g., arm closest to the aperture 118 formed in the housing 110 of the wiring device 100 for receiving the electrical wire) of the torsion spring 300 to an orientation of approximately 90 degrees from its rest state. After the electrical wire is inserted and the lever 210 is moved from the second position to the first position, the second or bottom arm 304 of the torsion spring 300 will attempt to return to its rest position, which causes the second or bottom arm 304 of the torsion spring 300 to contact a backside of the inserted electrical wire and thus application of a retention force onto the inserted electrical wire. At the same time, the first or top arm 302 of the torsion spring 300 biases the lever 210 to the first position regardless of whether an electrical wire is inserted into the wiring device 100.

In use, the opening 134 formed in the cage 132 and the clamp spring 250 may work together to achieve the function of securing wires of different gauges and/or construction (e.g., solid vs stranded wires and/or wires up to 12 gauge or a range of gauges). For example, the electrical wire receiving space S may be arranged and configured to receive a plurality different wire gauges and types. For example, the electrical wire receiving space S may be arranged and configured to receive a 12-gauge wire, a 14-gauge wire, etc. In addition, the electrical wire receiving space S may be arranged and configured to receive stranded wire, solid wire, etc. As illustrated, in one embodiment, the cage 132 may be monolithically formed with the contact 130. Alternatively, however, the contact 130 and cage 132 may be manufactured from multiple segments, which may be assembled together.

As illustrated, in various embodiments, the clamp spring 250 may be monolithically formed. Alternatively, however, the clamp spring 250 may be manufactured from multiple segments, which may be assembled together. Similarly, the biasing spring 270 may be monolithically formed. Alternatively, however, the biasing spring 270 may be manufactured from multiple segments, which may be assembled together.

Additionally, and/or alternatively, in accordance with one or more features of the present disclosure and as previously mentioned, the electrical wiring device can be any suitable wiring device now known or hereafter developed. For example, the wiring device can be duplex, decorator style, etc. Moreover, in use, the wiring device may include any suitable number of levers, which although shown and described as being vertically orientated (e.g., pivotable about a horizontal pivot), may be arranged and configured to pivot about a vertical pivot (e.g., horizontally orientated). In addition, and/or alternatively, the proximal end of the levers (e.g., portion of the levers opposite the pivot and which is arranged and configured to be grabbed by the user) are preferably arranged and configured so that when the levers are positioned in a closed position, the levers do not extend laterally beyond a perimeter of the device face. Thus arranged, the distance between the levers and the side of the electrical box is maximized.

Additionally, and/or alternatively, in accordance with one or more features of the present disclosure, the levers 210 may be color coded to assist the user with installation of the electrical wire. For example, in one embodiment, a first lever arranged and configured for a ground connection may be a first color such as, for example, green, a second lever arranged and configured for a neutral connection may be a second color such as, for example, white, a third lever arranged and configured for a common or phase connection may be a third color such as, for example, black, and a fourth lever arranged and configured for a traveler wire connection may be a fourth color such as, for example, red.

Figure 14A:
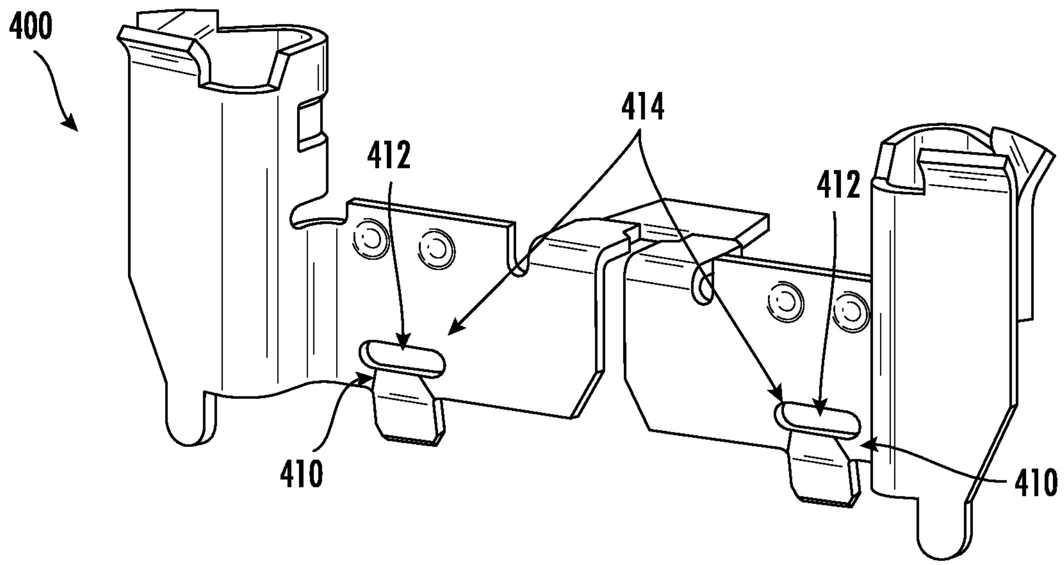
FIGS. 14A-15B illustrate various view of an alternate embodiment of a contact including a sharpened edge to provide increased pull-out resistance in accordance with one or more features of the present disclosure.
Figure 14B:
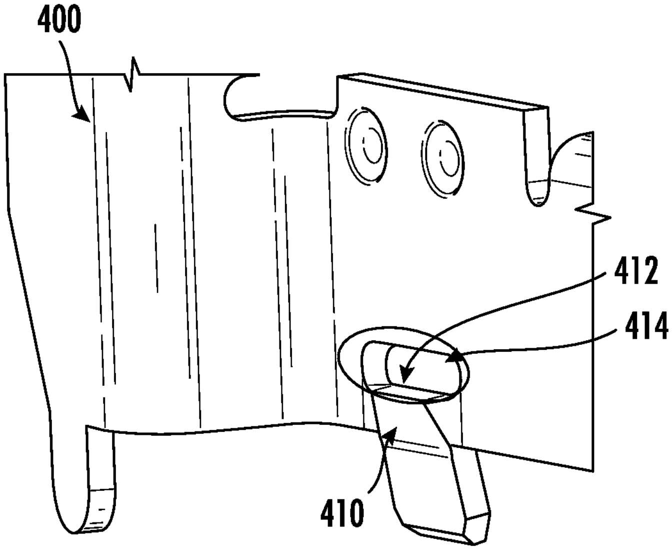

Additionally, and/or alternatively, in accordance with one or more features of the present disclosure that may be used in combination with any of the embodiments described herein, the contact may include a sharpened or sharp edge. That is, with reference to FIGS. 14A-14C, the contact 400 may include a projection or ledge 410 formed on the wire facing surface or side thereof. The projection or ledge 410 being arranged and configured to interact with an electrical wire W inserted into the wiring device. The projection or ledge 410 including a sharpened edge 412 for contacting and/or engaging the inserted electrical wire W. In use, the sharpened edge 412 formed on the projection or ledge 410 is arranged and configured to engage or bite into the inserted electrical wire W to provide increased pressure on the wire/contact interface against the force supplied by the clamp spring thereby enabling an improved electrical connection. In addition, in use, the sharpened edge 412 is arranged and configured to engage or bite into the inserted electrical wire W to increase pull-out performance (e.g., the leading surface on the projection or ledge is sharpened or sharp so that, in use, the sharpened edge bites into the inserted electrical wire W to provide increased resistance (e.g., additional retention force) against the electrical wire W being pulled out of the wiring device).

Figure 14C:
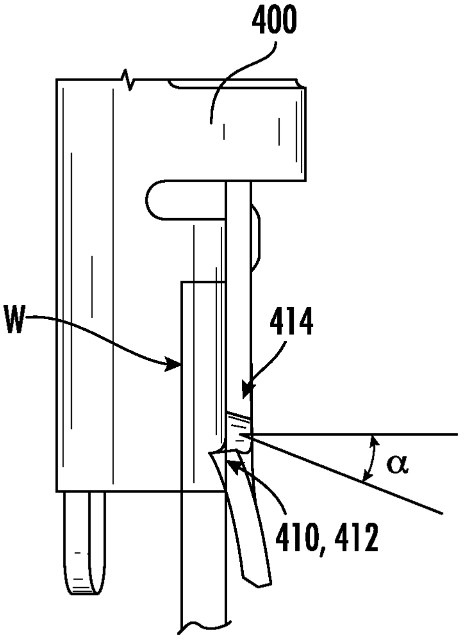

In accordance with one or more features of the present disclosure, the sharpened edge 412 formed on the projection or ledge 410 may be formed by a punched hole 414. That is, during manufacturing, a hole 414 is punched through the contact 400 thereby creating the sharpened edge 412 on the projection or ledge 410. In addition, during manufacturing, the material from the punched hole 414 may be twisted out from the terminal plane. In one preferred embodiment, the punched hole 414 through the contact 400 is angled by an angle $\alpha$, (FIG. 14C) which may be approximately fifteen (15) degrees relative to a plane perpendicular to the electrical wire W (or terminal plane). Thus arranged, when the material from the punched hole 414 of the contact 400 is twisted out of the plane, the surface created by the punch hole 414 is substantially perpendicular to the inserted electrical wire W as best illustrated in FIG. 14C (as opposed to creating a lead-out angle if the cut was not done at a fifteen (15) degree angle). In addition, by punching the hole 414 to create the sharpened edge 412 concerns over the life-span of the die conventionally used to create the sharpened edge wearing away over time are alleviated.

Figure 15B:
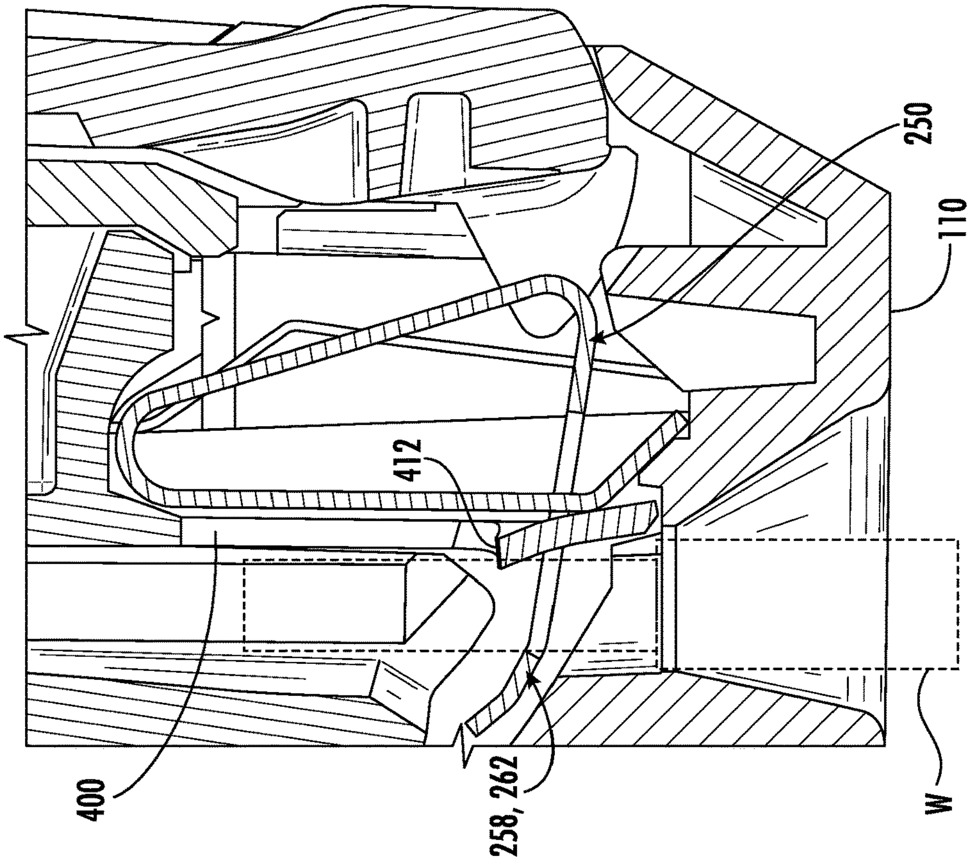
Figure 15A:
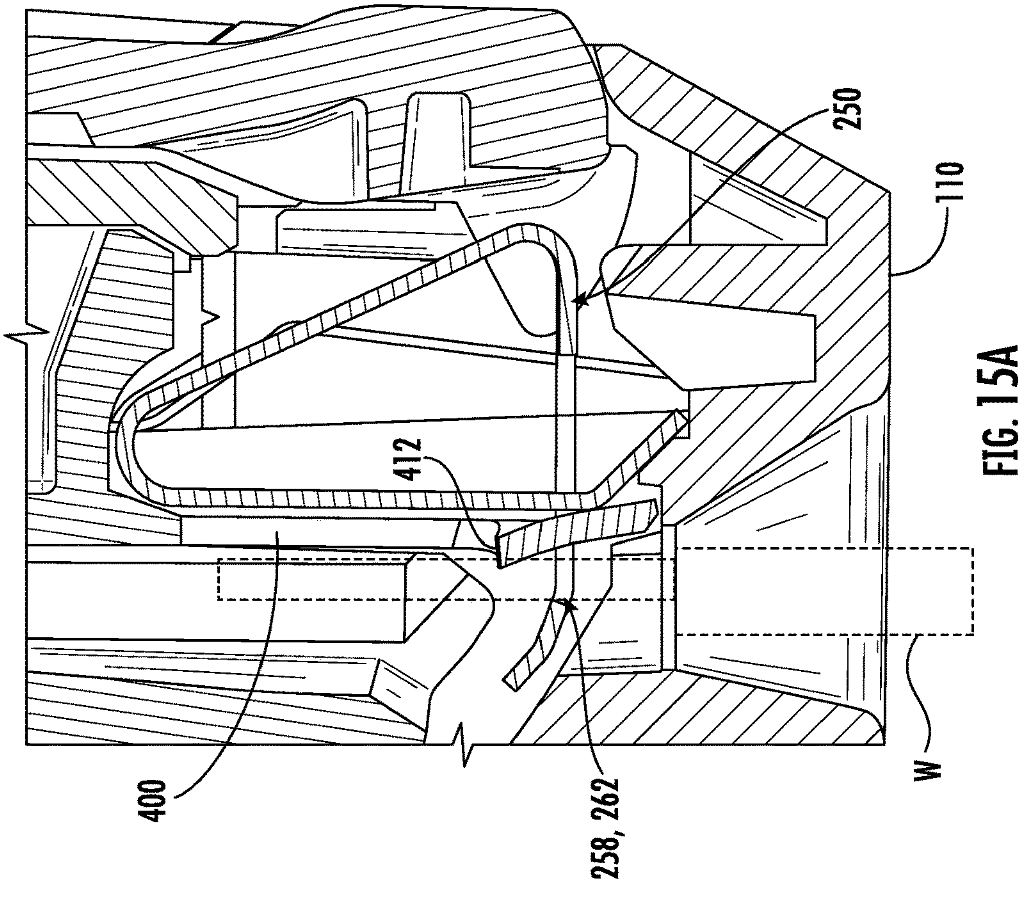

In use, with reference to FIGS. 15A and 15B, when the clamp spring 250 such as, when the sharpened stab 258 formed along the aperture of the wire contacting surface 262 of clamp spring 250, applies pressure to the outer surface of the inserted electrical wire W and begins to penetrate the outer surface of the electrical wire W, a substantially equal pressure can be applied to the opposite side of the electrical wire W by the sharpened edge 412 formed on the projection or ledge 410 formed on the contact 400. Thus arranged, in use, by providing a sharpened edge 412 on the contact side, an increase in pull-out resistance due to the added penetration from the sharpened edge 412 formed on the contact 400 has been found.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. A wiring device, comprising:

a housing;

an electrical contact disposed at least partially within the housing, the electrical contact arranged and configured to accept plug blades, the electrical contact further including a cage defining an opening; and a wire terminal arranged and configured to mechanically and electrically secure a line-voltage AC electrical wire to the electrical contact, the wire terminal including:

a lever arranged and configured to move between a first position and a second position;

a first spring positioned at least partially within the opening formed in the cage, the first spring and the opening defining an electrical wire receiving space; and a biasing element arranged and configured to apply a force onto the lever to maintain the lever in the first position;

wherein, in the second position, the lever moves the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

2. The wiring device of claim 1, wherein the biasing element is a biasing spring.

3. The wiring device of claim 2, wherein the biasing spring is disposed between the housing and the lever to bias the lever to the first position.

4. The wiring device of claim 3, wherein the biasing spring is selected from one of a compression spring, a leaf spring, and a torsion spring.

5. The wiring device of claim 3, wherein the biasing spring is a compression spring including a first end and a second end, the first end of the compression spring being in contact with the housing, the second end of the compression spring contacting the lever to exert a force to bias the lever to the first position.

6. The wiring device of claim 3, wherein the biasing spring is a leaf spring including a first leg and a second leg, the first leg of the leaf spring being in contact with the housing, the second leg of the leaf spring contacting the lever to exert a force to bias the lever to the first position.

7. The wiring device of claim 3, wherein the biasing spring is a torsion spring including a first segment and a second segment, the first segment of the torsion spring being in contact with the housing, the second segment of the torsion spring contacting the lever to exert a force to bias the lever to the first position.

8. The wiring device of claim 1, further comprising a secondary retention element arranged and configured to contact a portion of the electrical wire once the electrical wire has been inserted into the housing.

9. The wiring device of claim 1, wherein the lever is pivotable between the first and second positions.

10. The wiring device of claim 1, wherein the first spring includes a sharp edge arranged and configured to contact the electrical wire to provide additional retention force in maintaining the electrical wire in the electrical wire receiving space.

11. The wiring device of claim 1, wherein, in the second position, the lever moves the first spring away from the electrical contact to enlarge the electrical wire receiving space so that the electrical wire can be freely inserted without interference or resistance.

12. The wiring device of claim 1, wherein the first spring includes a first leg, a second leg, and a bend, wherein the bend couples the first and second legs, and wherein movement of the lever from the first position to the second position causes the first and second legs to move relative to each other to enlarge the electrical wire receiving space.

13. The wiring device of claim 12, wherein the lever includes a bearing surface, movement of the lever from the first position to the second position causes the bearing surface formed on the lever to contact the second leg of the first spring, which moves the second leg of the first spring.

14. The wiring device of claim 12, wherein the lever includes a bearing surface, movement of the lever from the first position to the second position causes the bearing surface formed on the lever to contact the second leg of the first spring, which compresses the second leg towards the first leg.

15. The wiring device of claim 1, wherein the housing includes an aperture formed in a rear surface thereof, the aperture being arranged and configured to receive the electrical wire therein, the aperture formed in the rear surface of the housing being aligned with the opening formed in the cage.

16. The wiring device of claim 15, wherein the wiring device further comprises a retention element for gripping a portion of the electrical wire once the electrical wire has been inserted through the aperture formed in the rear surface of the housing.

17. The wiring device of claim 16, wherein the retention element includes a torsion spring, the torsion spring including an arm, wherein movement of the lever to the second position moves the arm to a second position to allow the electrical wire to be inserted through the aperture formed in the housing, wherein subsequent movement of the lever from the second position to the first position causes the arm to contact the electrical wire and retain the electrical wire at least partially within the housing.

18. The wiring device of claim 17, wherein the arm is a second arm, the torsion spring further comprising a first arm, the first arm being part of the biasing element to contact the lever to exert a force onto the lever to bias the lever to the first position.

19. The wiring device of claim 1, wherein the wiring device is a line-voltage wiring device arranged and configured to be inserted into a wall box.

20. The wiring device of claim 19, wherein the line-voltage wiring device is selected from one of an electrical receptacle, ground fault circuit interrupters, and arc fault circuit interrupters.

21. The wiring device of claim 1, wherein the electrical contact includes a ledge having a sharpened edge arranged and configured to contact the electrical wire.

22. A wiring device, comprising:

a housing;

an electrical contact disposed at least partially within the housing, the electrical contact including a cage defining an opening; and a wire terminal arranged and configured to mechanically and electrically secure a line-voltage AC electrical wire to the electrical contact, the wire terminal including:

a lever arranged and configured to move between a first position and a second position;

a first spring positioned at least partially within the opening formed in the cage, the first spring and the opening defining an electrical wire receiving space; and a biasing element arranged and configured to apply a force onto the lever to maintain the lever in the first position;

wherein, in the second position, the lever moves the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

23. A wiring device, comprising:

a housing;

an electrical contact disposed at least partially within the housing, the electrical contact including a cage defining an opening; and a wire terminal arranged and configured to mechanically and electrically secure a line-voltage AC electrical wire to the electrical contact, the wire terminal including:

a lever arranged and configured to move between a first position and a second position;

a first spring positioned at least partially within the opening formed in the cage, the first spring and the opening defining an electrical wire receiving space;

a biasing spring arranged and configured to apply a force onto the lever to maintain the lever in the first position; and a retention element arranged and configured to grip a portion of the electrical wire once the electrical wire has been inserted through an aperture formed in a rear surface of the housing;

wherein, in the second position, the lever moves the first spring to enlarge the electrical wire receiving space to receive the electrical wire, and, in the first position, the first spring biases the electrical wire against the electrical contact to securely retain the electrical wire within the electrical wire receiving space and in contact with the electrical contact.

* * * * *